US012737676B2

(12) United States Patent
Palop et al.

(10) Patent No.: US 12,737,676 B2
(45) Date of Patent: Sep. 15, 2026

(54) MACHINE LEARNING BASED CONTENTION DELAY PREDICTION IN MULTICORE ARCHITECTURES

(71) Applicant: Collins Aerospace Ireland, Limited, Cork City (IE)

(72) Inventors: Hector Palop, Cork (IE); Raul De La Cruz Martinez, Rochestown (IE); Javier Mora De Sambricio, Cork City (IE); Blanca Florentino Liaño, Majadahonda (ES); Juan Valverde Alcala, Munich (DE); Phil Harris, Inniscarra (IE)

(73) Assignee: COLLINS AEROSPACE IRELAND, LIMITED, Cork City (IE)

( * ) Notice: Subject to any disclaimer, the term of this patent is extended or adjusted under 35 U.S.C. 154(b) by 907 days.

(21) Appl. No.: 17/979,905

(22) Filed: Nov. 3, 2022

(65) Prior Publication Data

US 2023/0140809 A1 May 4, 2023

(30) Foreign Application Priority Data

Nov. 4, 2021 (EP) .................................... 21206561
May 23, 2022 (EP) .................................... 22174935

(51) Int. Cl.
*G06F 11/34* (2006.01)
*G06N 20/00* (2019.01)

(52) U.S. Cl.
CPC ......... *G06N 20/00* (2019.01); *G06F 11/3409* (2013.01); *G06F 11/3419* (2013.01); *G06F 11/3428* (2013.01)

(58) Field of Classification Search
CPC . G06N 20/00; G06F 11/3409; G06F 11/3419; G06F 11/3428
See application file for complete search history.

(56) References Cited

U.S. PATENT DOCUMENTS 6,643,613 B2 * 11/2003 McGee .............. G06F 11/0709 709/224
6,850,920 B2 * 2/2005 Vetter ................ G06F 11/3404 714/E11.197

(Continued)

OTHER PUBLICATIONS

Extended European Search Report for EP Application No. 22174935.1, dated Mar. 1, 2023, pp. 1-11.

(Continued)

*Primary Examiner* — Beau D Spratt
(74) *Attorney, Agent, or Firm* — CANTOR COLBURN LLP

(57) ABSTRACT

A method of generating training data for training a Machine Learning based Task Contention Model, ML based TCM, to predict time delays resulting from contention between tasks running in parallel on a multi-processor system is provided herein. The method includes: executing a plurality of microbenchmarks, μBenchmarks $B_j$, on the multi-processor system in isolation and measuring a number of resultant Performance Monitoring Counters, PMCs, over time to extract ideal characteristic footprints of each μBenchmark when operating in isolation; performing a feature correlation analysis on the PMCs resulting from the plurality of μBenchmarks to determine the degree of correlation between each resultant PMCs and the executed plurality of μBenchmarks; selecting a number of PMCs based upon their degree of correlation between the plurality of μBenchmarks to form a reduced PMC array.

14 Claims, 12 Drawing Sheets

(56) References Cited

U.S. PATENT DOCUMENTS

| | | | | |
|---|---|---|---|---|
| 7,318,051 | B2 * | 1/2008 | Weston | G06F 18/2113 706/12 |
| 8,943,287 | B1 | 1/2015 | Miller et al. | |
| 9,618,999 | B1 * | 4/2017 | Bertran | G06F 1/324 |
| 10,043,139 | B2 | 8/2018 | Arndt et al. | |
| 10,209,711 | B1 | 2/2019 | Brazeau | |
| 10,402,746 | B2 | 9/2019 | Eicher et al. | |
| 10,664,325 | B1 | 5/2020 | Radack et al. | |
| 10,728,358 | B2 | 7/2020 | Dhanabalan et al. | |
| 10,871,989 | B2 | 12/2020 | Venkataraman et al. | |
| 12,400,106 | B1 * | 8/2025 | Diamant | G06N 3/063 |
| 2006/0212875 | A1 * | 9/2006 | Haller | G06F 9/4856 718/107 |
| 2013/0191612 | A1 * | 7/2013 | Li | G06T 15/005 712/30 |
| 2015/0205637 | A1 * | 7/2015 | Lee | G06N 20/10 718/105 |
| 2016/0328273 | A1 | 11/2016 | Molka et al. | |
| 2017/0206462 | A1 | 7/2017 | Arndt et al. | |
| 2017/0322241 | A1 | 11/2017 | Tang et al. | |
| 2018/0225976 | A1 * | 8/2018 | Rinehart | G06N 7/01 |
| 2019/0102213 | A1 * | 4/2019 | Yousaf | G06F 11/3072 |
| 2020/0042398 | A1 | 2/2020 | Martynov et al. | |
| 2020/0159572 | A1 * | 5/2020 | Jägemar | G06F 9/5066 |
| 2020/0410254 | A1 | 12/2020 | Pham et al. | |
| 2021/0150921 | A1 * | 5/2021 | Frontera | G08G 5/22 |
| 2022/0269796 | A1 * | 8/2022 | Chase | G06F 21/32 |
| 2023/0137788 | A1 | 5/2023 | De La Cruz Martínez et al. | |

OTHER PUBLICATIONS

European Search Report for Application No. 21206561.9, mailed Jul. 28, 2022, 11 pages.

Buchaca et al., "Sequence-to-sequence models for workload interference prediction on batch processing datacenters" (Published: 2020)).

Hoffmann et al., "Online Machine Learning for Energy-Aware Multicore Real-Time Embedded Systems" (Published: Feb. 2021).

Inam et al., Bandwidth Measurement using Performance Counters for Predictable Multicore Software (Published: 2012).

Iorga et al., "Slow and Steady: Measuring and Tuning Multicore Interference" (Published: 2020)).

Palomo et al., "Accurate ILP-based contention modeling on statically scheduled multicore systems" (Published: 2019).

* cited by examiner

Figure 1:
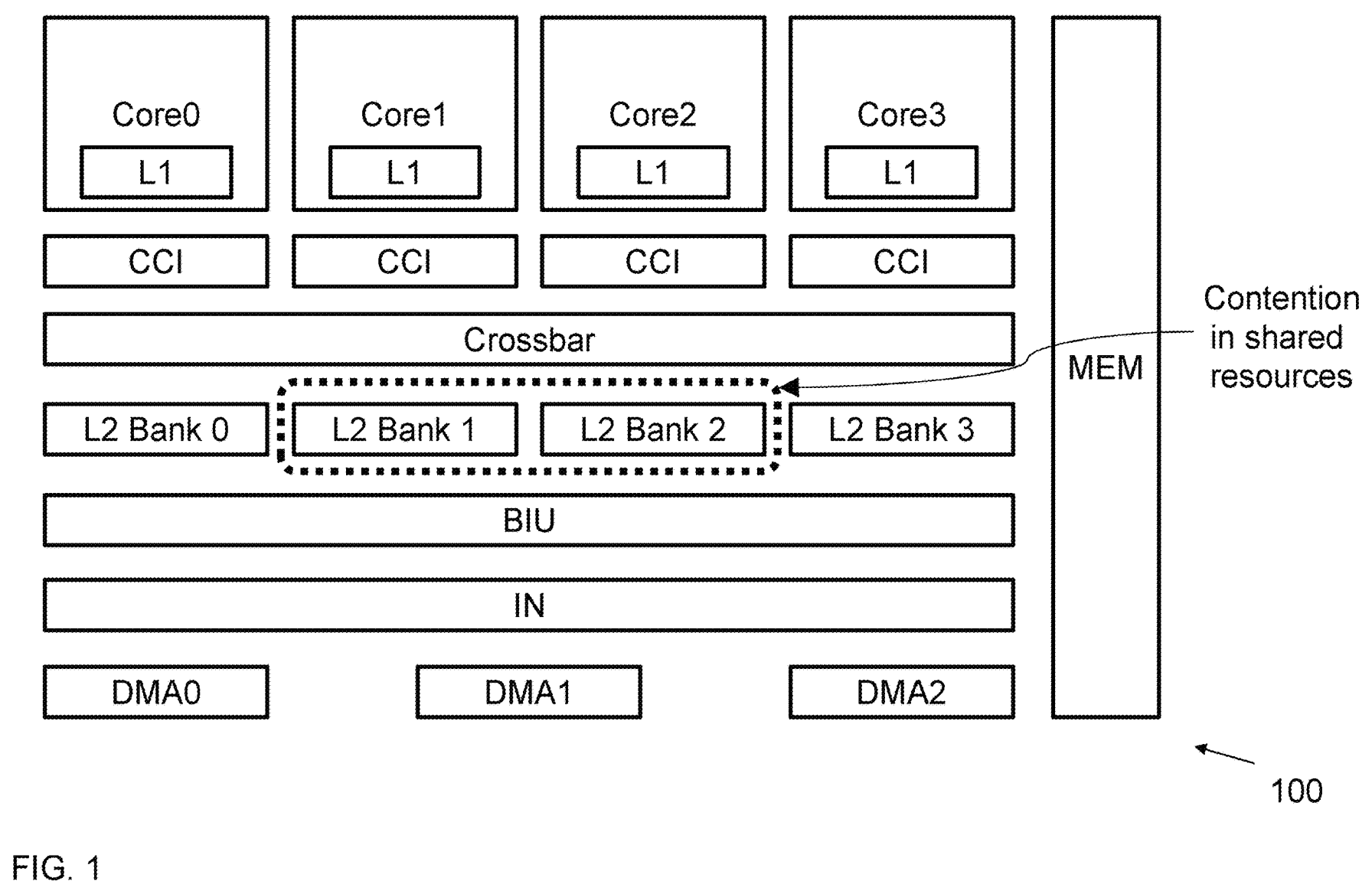

Contention in shared resources

100

MEM

Core0
L1
Core1
L1
Core2
L1
Core3
L1

CCI
CCI
CCI
CCI

Crossbar

L2 Bank 0
L2 Bank 1
L2 Bank 2
L2 Bank 3

BIU

IN

DMA0
DMA1
DMA2

MACHINE LEARNING BASED CONTENTION DELAY PREDICTION IN MULTICORE ARCHITECTURES

CROSS-REFERENCE TO RELATED APPLICATIONS

This application claims priority to European Patent Application No. 21206561.9 filed Nov. 4, 2021, and European Patent Application No. 22174935.1 filed May 23, 2022, the entire contents of which is incorporated herein by reference.

FIELD

This invention relates to interference channel contention modelling using machine learning and hardware performance monitoring counters (PMCs) data, and specifically to how machine learning models may be trained and selected so as to provide accurate contention modelling.

BACKGROUND

There has been a recent movement from single core processors to processors with multiple processing cores within the same processor device, which can provide a significant performance increase with a similar amount of power consumption.

As such, a wide range of multi-processor system-on-chip (MPSoC) architectures targeted for embedded applications have appeared on the market over the last years. This kind of SoC includes multiple processing cores, either homogeneous or heterogeneous, on the same die. Multi-core processors (MCP) with two or more processing cores overcome the frequency scaling, power consumption and heat dissipation problems associated with single core processors, all whilst the effective throughput is increased.

As such, MCPs have delivered significant performance improvements over traditional single-core processors. However, their use in safety-critical systems (such as avionics systems) poses some unique challenges that are otherwise not present in typical single-core processors, which otherwise run a single process at a time.

For efficiency, MCP designs include shared resources on the device. Processor cores in MCPs are typically tightly or loosely coupled, sharing intermediate memory systems (cache hierarchies) and interconnection buses in order to access main memory and external input/output (I/O) devices. MPSoC architectures, in order to simplify board layout design, integrate more components onto the device to reduce the physical footprint.

Depending on the hardware implementation, tasks running on different cores (i.e. different processes or threads) may share some of these resources while they are being executed. For example, FIG. 1 shows an example MPSoC 100 and the resources that are shared between four separate cores (Core0-Core3), specifically the four Level 2 cache banks (L2 Bank 0-Bank 3), which the cores access through a common crossbar via respective core/cluster interfaces (CCI), and the common bus interface unit (BIU), Interconnection Network (IN), three direct-memory access units (DMA0-DMA2) and memory (MEM). However, the simultaneous execution of tasks on a parallel computer architecture can cause contention in the form of delays accessing certain shared resources and thus interference and variability on their typical execution time. For example, in the MPSoC 100 of FIG. 1, contention is highlighted as occurring in the two L2 banks Bank 1 & 2, although it can of course occur in other resources at other times, depending on what tasks are being executed simultaneously. Contention can be a particularly serious issue when it comes to real-time and/or safety-critical systems.

In safety-critical applications, for example in avionics systems such as those for helicopters or other aircraft, there are specific requirements that stem from the concurrent performance of tasks in MCPs. These include application isolation and determinism. Application isolation relates to the separation of the tasks of one application from the rest of the running processes, e.g. to shield the application from exploits. Determinism is the property of, when given a particular input, always producing the same output, and always passing through the same sequence of states. Furthermore, in such situations and for certification, it is typically necessary to know the actual execution time of a given set of tasks, which cannot be known without knowing the structure of a MCP and any potential contention between the tasks.

In this way, when providing a MCP for safety-critical uses, it is generally necessary to ensure that multiple applications running on a single core do not interfere with another application's performance, and additionally that each core will execute its designated tasks in the proper sequence at all times, and within an acceptable time period.

Multi-core semiconductor manufacturers designing MCPs for the commercial market tend to optimize their processors for performance, not safety and isolation, and additionally do not tend to publish details of the internal structure of their MCPs. In this way, it is difficult to predict the kinds of scheduling conflicts that might occur. This can make it challenging to design software for execution by such processors, especially in safety-critical contexts.

Specifically, in the real-time embedded system realm for avionics, task interference due to the contention on shared resources poses a big challenge for determinism, and therefore, certification. The uncertainty of not knowing beforehand the actual execution time on an MCP hinders certification on the avionics scope, e.g. as detailed in the CAST-32A, MULCORS and ARINC-653 papers.

It is common to describe control systems using model-based design techniques (MBD), where a system is modelled as a network of interconnected data processing blocks (also referred to as tasks) that execute repeatedly and send data to each other. Two examples of such execution models are multi-periodic (MP), where each task is executed with a certain fixed periodicity, and synchronous dataflow (SDF), where a task is executed when data is available in all of its inputs.

Most general purpose modelling tools use multi-periodic execution models with configurable options about priorities, parallelization, etc. While this is very intuitive for algorithm designers, it can be problematic in that execution relationships amongst tasks are very often arbitrarily selected. Migrating these models, including behavioral and scheduling aspects, to a multi-core embedded computer is very challenging since the granularity of the tasks, proportionality amongst periods, feedback loops, etc. are typically not well optimized.

Therefore, whilst MCPs can advantageously execute tasks in parallel, such operation can result in some or all of the issues outlined above, e.g. delays or failures relating to contention, which must be avoided in safety-critical applications where tasks must be completed within a given time window.

SUMMARY

From a first aspect, there is provided a method of generating training data for training a Machine Learning based Task Contention Model, ML based TCM, to predict time delays resulting from contention between tasks running in parallel on a multi-processor system. The method includes: executing a plurality of microbenchmarks, μBenchmarks $B_j$, on the multi-processor system in isolation and measuring a number of resultant Performance Monitoring Counters, PMCs, over time to extract ideal characteristic footprints of each μBenchmark when operating in isolation; performing a feature correlation analysis on the PMCs resulting from the plurality of μBenchmarks to determine the degree of correlation between each resultant PMCs and the executed plurality of μBenchmarks; selecting a number of PMCs based upon their degree of correlation between the plurality of μBenchmarks to form a reduced PMC array.

From a second aspect, there is provided a computer system for producing training data for training a Machine Learning based Task Contention Model, ML based TCM, to predict time delays resulting from contention between tasks running in parallel on a multi-processor system, wherein the computer system is configured perform the method that is considered above.

From a third aspect, there is provided a computer software comprising instructions which, when executed on a computer system, cause the computer system to produce training data for a Machine Learning based Task Contention Model, ML based TCM, to predict time delays resulting from contention between tasks running in parallel on a multi-processor system, by performing the method above.

Thus it will be seen that, in accordance with examples of the disclosure, training data may be produced for training a Task Contention Model, TCM, and therefore the TCM can be generated for a given architecture in a much more efficient manner than is currently possible with classical, manual techniques. Such a TCM may find various uses when it comes to scheduling and/or mapping tasks onto a given architecture, whilst accurately reflecting the actual execution time of the scheduled tasks.

The methods and systems that are considered herein, which result the generating of specific training data that can be used to produce a ML based TCM for a given multi-processor system, can allow for the time required to train and produce an accurate TCM to be vastly reduced, by allowing for a fast characterization of interference channels. This opens up the possibility for more commercial off the shelf, COTS, systems (where the internal structures are unknown), to be utilised in safety critical applications where tasks must be completed in a given makespan, and it is therefore critical to know the worst case execution time of tasks in contention.

By utilising the degree of correlation between PMCs for various different μBenchmarks/tasks to reduce the PMC array to be used as an input to the TCM array, not only is the time taken for convergence of an ML based TCM reduced, but the root mean squared error (RMSE) of the regression task (averaged between all cores) may also be reduced. Therefore, pruning the PMC array using correlation (and cohesion) to produce a ranking of feature importance to select the most valuable PMCs for input into training the ML-based TCM can not only reduce the time for convergence, but actually also improve prediction results The plurality of μBenchmarks may be selected based on the Arithmetic Intensity, AI, of each μBenchmark so as to stress certain interference channels of the multi-processor system in an isolated way.

By selecting μBenchmarks that represent the whole spectrum tasks, those being tasks from AI roughly equalling 0 (i.e. those with an AI metric close to 0, that have many memory transactions and only few floating point operations) to tasks with a high AI metric (i.e those with many flops and only a few reads/writes), it is possible to give a wide representation of actual tasks that are to be completed on an MCP architecture, and will therefore be able to train a more accurate TCM.

The plurality of μBenchmarks may be selected from a pre-populated code block repository, and are selected so as to generate the desired interference and contention scenarios for training data that may be used in training an accurate ML-based TCM.

This again speeds up the time that is needed to produce a TCM, as the μBenchmarks may be readily selected.

The plurality of μBenchmarks may be selected such that they each individually have a shorter execution time individually than a maximum makespan for a given task to be scheduled on the multi-processor system.

By using μBenchmarks that accurately reflect the tasks that are ultimately to be scheduled on a multi-processor system, it is possible again to more accurately train a ML based TCM, such that it more accurately predicts delays for a given use case.

From a fourth aspect, there is provided a computer-implemented method of producing a trained Machine Learning based Task Contention Model, ML based TCM, to predict time delays resulting from contention between tasks running in parallel on a multi-processor system using the training data generated by the method of the first aspect. The method includes:| executing possible pairing scenarios of the plurality of μBenchmarks in parallel on the multi-processor system and measuring the effect on the execution time of each μBenchmark, $\Delta T^{B_j}$, resulting from contention over interference channels within the multi-processor system; and training a machine learning model using, as an input, the reduced PMC array for each μBenchmark in isolation and, at the output, the corresponding $\Delta T^{B_j}$ during the parallel execution of each pairing scenario as training inputs.

From a fifth aspect, there is provided a Machine Learning based Task Contention Model, ML based TCM, produced by the method above.

From a sixth aspect, there is provided a computer system for producing a trained Machine Learning based Task Contention Model, ML based TCM, to predict time delays resulting from contention between tasks running in parallel on a multi-processor system, wherein the computer system is configured perform the method that is considered above.

From a seventh aspect, there is provided a computer software comprising instructions which, when executed on a computer system, cause the computer system to produce a trained Machine Learning based Task Contention Model, ML based TCM, to predict time delays resulting from contention between tasks running in parallel on a multi-processor system, by performing the method above.

Thus it will be seen that, in accordance with examples of the disclosure, a Task Contention Model, TCM, may be produced for a given architecture in a much more efficient manner than is currently possible with classical, manual techniques. Such a TCM may find various uses when it comes to scheduling and/or mapping tasks onto a given architecture, whilst accurately reflecting the actual execution time of the scheduled tasks.

The methods and systems that are considered herein, which result in the generating of specific TCMs for a given multi-processor system, allow for the time required for certification of such a system to be vastly reduced, by allowing for a fast characterization of interference channels.

This opens up the possibility for more commercial off the shelf, COTS, systems (where the internal structures are unknown), to be utilised in safety critical applications where tasks must be completed in a given makespan, and it is therefore critical to know the worst case execution time of tasks in contention.

Micro-benchmarks (μBenchmarks), are synthetic programs or routines that may be operated on a multi-processor system that relate stress on interference channels of the multi-processor system to performance measures that are embodied in the PMCs. μBenchmarks generally operate by generating specific activities on shared resources, and as a result, they bring out multicore timing interference and, ultimately allow for analysis of the impact of interference channels on software timing. In this way, μBenchmarks can be selectively deployed to cause a configurable and quantifiable pressure on a specific resource.

The number of μBenchmarks (or tasks) that may be run in parallel on a multi-processor system depends on the structure of the system itself. For example, given an architecture with c physical cores, the maximum number of tasks able to run simultaneously (provided only one task at a time runs on a single core) will be ntasks=c, and therefore $1<ntasks\leq c$. This allows for a calculation of the possible pairing scenarios of the μBenchmarks. A pairing scenario does not necessarily relate to the simultaneous only processing of only two μBenchmarks, but rather to any conceivable combination of μBenchmarks that can be simultaneously processed in the given architecture. In this way, in a quad core system, a pairing scenario could relate to a combination of four μBenchmarks. The method above may execute all possible pairing scenarios (i.e. every unique combination of μBenchmarks), or a subset of pairing scenarios may be selected from the plurality of μBenchmarks.

By executing the selected pairing scenarios, it is therefore possible to measure the effect on the execution time of a μBenchmark, in each pairing scenario. In this way, a μBenchmark executed in isolation might have an execution time $T^{B_j}$, when executed in parallel with one or more other μBenchmarks, the execution time might increase due to contention on shared resources, by an amount $\Delta T^{B_j}$.

Therefore, the selected μBenchmarks can be characterised by measuring their PMCs in isolation over time, and it can also be measured how such μBenchmarks (and therefore tasks with a certain PMC profile in isolation) result in contention, and therefore an increase in execution time on a given architecture. Using these measures, it is possible to train a ML algorithm for a given architecture, to predict the potential effect on the execution times of given task pairings, given only their PMC profiles when executed in isolation.

The machine learning model may be a decision tree-based predictor, and such as an XGBoost model. Such predictors may produce more accurate TCMs.

It is possible to validate the training error of the ML based TCM by: executing a plurality of actual execution tasks on the multi-processor system in isolation and measuring the resultant PMCs corresponding to the reduced PMC array over time for each actual execution task; inferring, by the ML based TCM, the predicted effect on the execution time of each actual execution task given the at least the resultant PMCs of each task as input; executing the actual execution tasks in parallel and measuring the actual execution time; and comparing the predicted effect on the execution time with the actual execution time, thereby calculating an error between the predicted and actual execution time.

With such validation, it may be confirmed that the trained model is accurate, and may be used in predicting delays resulting from contention between tasks.

The training may comprise a first iterative loop over all different pairing scenarios; and a second iterative loop over each of the selected PMC measures of each μBenchmark in isolation, as well as the corresponding $\Delta T^{B_j}$ during the parallel execution of each pairing scenario.

The at least one PMC may be selected based an identification of the PMCs that are associated with interference channels on the multi-processor system. In general, as a default, all PMCs that are available on the platform may be gathered. However, the ML TCM system may converge faster with a smaller subset of PMCs, and therefore it may be desired to select only a number of PMCs for analysis.

The measuring of at least one PMC may comprise measuring the selected PMCs at a variable monitoring frequency. Whilst a finer the PMC measure may be better, it is also desirable to minimise the overhead. Therefore, using a variable monitoring frequency can achieve both of these requirements.

Each μBenchmark may be a synthetic benchmark that is selected so as to stress certain interference channels of the multi-processor system in an isolated way. These can provide pertinent information for characterising interference channels on a given architecture.

The above methods and systems may find particular use with multi-processor systems that are to be used in safety-critical applications. For example, the multi-processor system may be a multi-core processor of an avionics system.

The multi-processor system may be a homogenous platform, or the multi-processor system is a heterogenous platform or not symmetric. The above methods and systems are equally applicable to any structure of multi-processor systems.

Once a ML-based TCM is created for a given architecture, for example using the methods and/or systems above, only task behaviour in isolation is required to produce an accurate TCM, which greatly reduces the amount of data that needs to be collected so as to produce a TCM that can output the given time delay between a giving pairing/set of tasks. This mitigates the need to measure the effect of every pairing scenario of a given set of tasks to determine the time delays that result from each pairing scenario.

There is also described a computer-implemented method of predicting time delays resulting from contention between tasks running in parallel on a multi-processor system using a trained Machine Learning based Task Contention Model, ML based TCM. The method includes executing a plurality of actual execution tasks on the multi-processor system in isolation and measuring at least one resultant Performance Monitoring Counter, PMC, over time to extract ideal characteristic footprints of each actual execution task when operating in isolation; and inferring, from a ML based TCM, a predicted effect on the execution time of each actual execution task given the at least one resultant PMC of each task as input.

Further, there is described a computer-implemented method of scheduling a plurality of tasks for execution by a multi-processor system, wherein the scheduling uses time delays predicted by the method of the fifth aspect.

By using such a ML based TCM, it is possible to predict the effect of contention on any given pairing of tasks given only their characteristic performance profile when operated in isolation. This is a much more scalable process than the performing and recording the execution time on all possible pairing scenarios of a given number of tasks on a given number of cores.

The predicted effect execution time of each actual execution task may be aggregated for contending tasks so as to predict a worst case execution time, WCET. Such a WCET is particularly useful in safety critical. The trained ML based TCM may be a trained ML based TCM produced by the systems or methods of any of the first to fourth aspects.

BRIEF DESCRIPTION OF THE DRAWINGS

Certain examples of the disclosure will now be described, by way of example only, with reference to the accompanying drawings, in which:

FIG. 1 is a schematic diagram of an example MPSoC with multiple computational units, shared memory hierarchies and interconnection buses;

FIG. 9*b* shows a subsection of FIG. 9*a* showing the feature correlation analysis of PMCs resulting from within a task;

DETAILED DESCRIPTION

Whilst the methods and systems herein may be described with regards to a multi-core processor (MCP), it would be appreciated that the teaching herein is not limited to only a single processor with multiple cores, but also other multiple processing systems, such as a network of separate processors (i.e. multi-processor systems).

Figure 2:
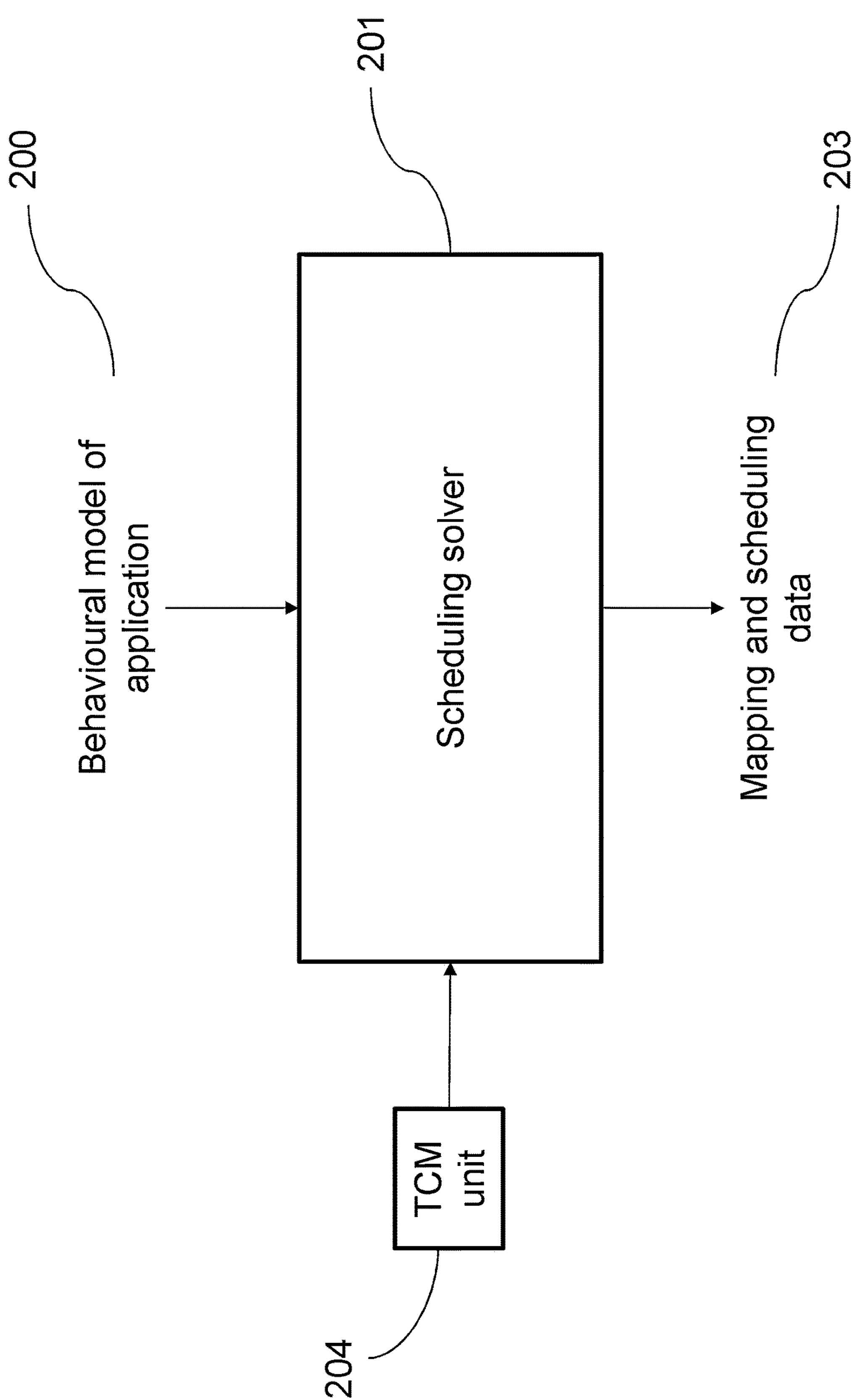
FIG. 2 is a schematic diagram of a system for producing software for a MCP.

For implementation on a given MCP architecture, the tasks of a control system need to be scheduled and mapped to respective cores, e.g. using a system as shown in FIG. 2, in order to generate software that can be executed on the particular MCP (e.g. within an aircraft). In the example of FIG. 2, a behavioural model (i.e. an execution model) of an application 200 is provided as input to a scheduling solver 201, which outputs mapping and scheduling data 203 that can be used in producing executable code for execution on multi-core processors.

In the context of MCPs, the scheduling solver 201 determines a time-partitioned schedule, which schedules executing tasks in synchronized time windows in order to guarantee a certain level of isolation. This is a static approach where tasks are mapped to a per-core "ready" queue prior to scheduling and cannot migrate between cores. However, even with such isolation, contention delays still occur in multi-core systems due to the concurrent accesses to shared resources by tasks executed concurrently in the same or different partitions. It is difficult to predict the delays that will result from such contention delays due to the high number of possible core and task combinations, which lead to different delay values. These delays should be considered when computing schedules where the make-span (i.e. total execution time) is to be minimized.

It is possible to approximate contention delays by extracting a task contention model (TCM) from the hardware platform, and inputting delays determined from this model into the scheduling solver 201. In order to shed some light on the predictability of Real-Time applications on MCP architectures, TCMs can be built to help estimate the worst case execution time (WCET) for each possible set of contending tasks depending on the final task-to-core mapping.

Here, a TCM 204 receives, as an input, execution footprints of a set of tasks to be executed in parallel on the MCP architecture (for example, the use pattern of interference channels as cache, buses, ports and I/O devices). Then, as an output, the TCM 204 generates the tasks' WCETs when they contend with their pairwise tasks running at the same time in parallel on the MCP architecture.

An issue that exists with this is that a simplistic scheduling solver would require all the possible delays to be provided as an input all together, if the scheduling solver is to take the possible contention delays into account. This is not generally feasible when considering MCPs, due to the high number of possible assignments of tasks to cores, which all lead to different delay values. In MCPs, not only scheduling but also task mapping to cores is required. Therefore, depending on the mapping, communication mechanisms and data dependency amongst tasks will vary which makes it very difficult or infeasible to have all combinations precalculated.

Figure 3:
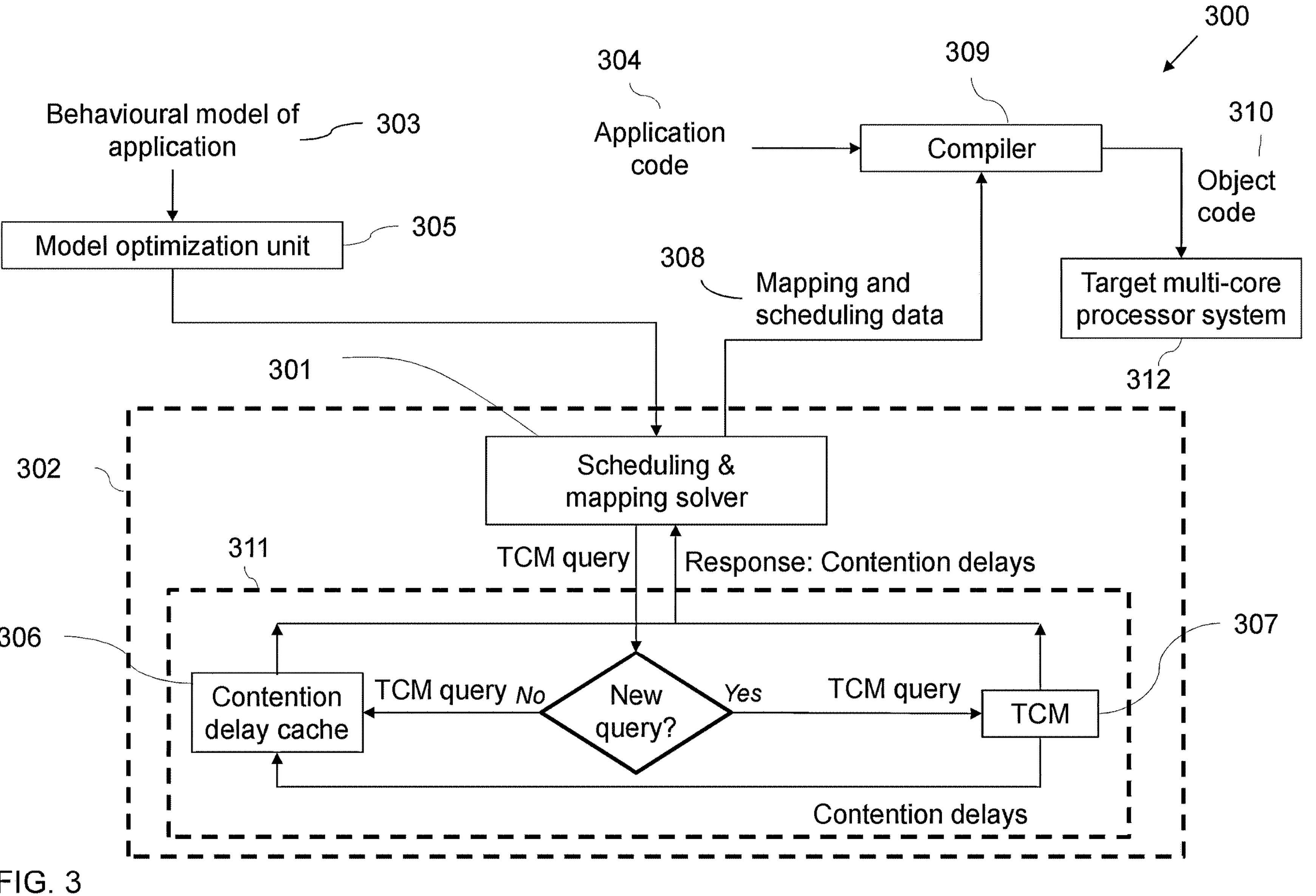
FIG. 3 is a schematic diagram of a system for producing optimised software for a MCP.

FIG. 3 shows a software-development system 300 for compiling software for execution on a target MCP 312. The development system 300 may be executed on a workstation or other computer processing system as part of a software development processor. The target MCP 312 may be located on an aircraft, for example. The development system 300 includes a scheduling system 302 for scheduling tasks that mitigates the above issues. Such an MCP 312, located with the optimised software, may then be used in safety-critical applications, such as within avionics.

As above, control systems are often described using MBDs, which typically tend to be multi-periodic execution models. These present problems in migrating the models onto a MCP, as they are not well optimised for parallel operation. Therefore, in order to optimise the models for parallel operation, the tasks that make up a behavioural model 303 (e.g. a task graph) for the application 304 are optionally factorized and/or reordered in a model-optimization unit 305, to translate a multi-periodic (MP) task graph into a synchronous dataflow (SDF) task graph, or to optimize an existing SDF model. Whilst such optimization finds particular use in the MCP space (such as in the example of FIG. 3), such approaches may also be applicable to any embedded system or other multi-processor system, and not only in a MCP, as many systems can be improved by a more efficient execution model.

Essentially, factorising and reordering the behavioural model 303 of the application 304 allows for the provision of an improved execution model (i.e. task graph) in which tasks have been modified such that they can be scheduled in a more efficient manner. The resulting model can be more easily mapped and scheduled to the cores of the MCP 312, resulting in more efficient utilisation and potentially concurrent usage of the multiple cores, whilst still resulting in the same outputs as the original model, but in a reduced time and with fewer constraints. The maintenance of the behaviour of the original model means that all tests and analysis performed in the original model (such as simulations) will still be valid for the transformed model, so they do not need to be repeated, reducing the production time.

As can be seen in FIG. 3, the factorized execution model 303 may be provided to a scheduling-and-mapping solver 301 in the scheduling system 302. Of course, any model (whether optimised in unit 305 or not) may be provided to the solver 301, although an optimised model may result in a faster implementation that is more likely to meet timing requirements.

In order to mitigate the issues described above regarding the prior calculation of, and concurrent provision of, all delays as an input to a scheduling solver, the scheduling system 302 of FIG. 3 provides a communication interface between the scheduling-and-mapping solver 301 and a TCM system 311 (which contains a TCM 307).

Such an interface finds use whatever optimization technology is implemented in the solver 301. The solver 301 may be an exact solver (e.g. that uses mathematical programming or constraint programming), or an approximate solver (e.g. that uses metaheuristics).

Given the execution model (e.g. SDF task graph) 303 at its input, the scheduling-and-mapping solver 301 generates an initial schedule without taking into account any contention delays. Rather than having to anticipate all possible contention delays from all conceivable pairs of tasks and cores in advance, the solver 301 then dynamically queries the TCM system 311 once its optimizer proposes a solution where no delays have been taken into account.

The TCM can support queries as to the delay for a given pair or larger set of contending tasks that execute in a single time frame, or equally the delay for a given sequence of pairs/set of contending tasks. However, the dynamic querying of the solver 301 of the TCM system may allow for the solver 301 to more rapidly converge on an acceptable solution as the delay for an isolated pair/set of contending tasks can be calculated, as and when the solver 301 considers the concurrent scheduling of said tasks.

In response to such a TCM query, the TCM system 311 then calculates the delay that is associated with the proposed solution. It returns these contention delays to the solver 301.

For a proposed solution, all of the pairs or sets of tasks running in parallel are given to the TCM in order to calculate the corresponding delays, then these delays need to be added to the time calculated in the scheduling (to each corresponding task). When these delays have been taken account, the proposed solution can be checked such that the deadlines and makespans are still accomplished. If such deadlines would be missed with the proposed solution, then the solver 301 needs to reiterate and propose a new solution. A new solution may require a change in mapping (i.e. pinning tasks to a different core (where possible)), and/or a change in scheduling (i.e. to reorder the execution of these tasks on the cores to reduce contention).

The optimization process then continues iteratively by the solver 301 considering the generated delays and computing new solutions. The first solution where all the delays are taken into account and which meets any required deadline and makespan conditions (e.g. having a total makespan that is below a predetermined maximum) may be provided as an output 308. Such a pseudo-optimal solution, given that it meets all deadlines, may then be implemented on the target MCP system. Of course, as this process is iterative, the solver 301 may in some examples continue further in order to find a better or best solution, with a shorter or shortest possible makespan.

Optionally a caching mechanism is implemented by the TCM system 311 in order to minimize the queries performed to the actual TCM 307 (i.e. the underlying contention-model data and the interface to it), as shown in FIG. 3. This avoids performing the same TCM query multiple times, so as to improve the processing efficiency of the scheduling system 302. Solutions proposed by the scheduling solver 301, and their associated response from the TCM 307, are stored in a contention delay cache 306 within the TCM system 311. Any subsequent query that is received from the scheduling solver 301 is compared to the existing contention delay cache 306, and, if the query has already been made, the corresponding contention delay is retrieved from the cache 306, as opposed to re-querying the TCM 307.

With such an interfacing between a task contention model system 311 and a scheduling/mapping solver 301, the scheduling system 302 is able to take all of the parameter values as an input, whilst avoiding a complete enumeration of all possible contention delay values. This makes the scheduling system 302 much more scalable with increasing numbers of cores and tasks.

As mentioned above, such a framework can be implemented in different types of real time critical systems where minimizing the make-span brings an improvement in terms of system responsiveness.

Once an acceptable solution is found, the scheduling solver 301 may output a corresponding set of mapping and static scheduling data 308. This data 308 may be input to a compiler 309 or other component of a real-time operating system (RTOS) or hypervisor toolchain, along with application source code 304, to generate object code 310 for executing the application tasks on appropriate cores of the target multi-core system 312, such as a system within an aircraft.

As discussed above, TCMs can be useful to help predict the amount of contention that is likely to be present in a proposed schedule, or potential contention between a given pair of tasks when running simultaneously. A TCM receives at its input, the execution footprints of a set of tasks to be executed in parallel on a particular MCP architecture. Then, the TCM generates the WCETs of the tasks, taking into account the contention between given tasks. This data can then be used to find the best task mapping/scheduling that minimizes the total execution time.

In order to build an accurate TCM, several ingredients are required. First, detailed information about the interference channels on a given architecture must be provided, e.g., behaviour, read and write policy, maximum throughput, frequency, access concurrency, arbitration policies, or any other peculiarity that might affect concurrent access performance. As mentioned above, access to the specifications of the interference channels is very limited in commercial off-the-shelf (COTS) MCP devices, where information is usually not clearly documented by the manufacturer.

As a consequence, researchers and engineers looking to build an accurate TCM must develop ad-hoc microbenchmarks (μBenchmarks) that stress interference channels of a MCP to unveil and characterize their behaviour in detail. Such μBenchmarks generally operate by generating specific activities on shared resources, and as a result, they bring out multicore timing interference and, ultimately allow for analysis of the impact of interference channels on software timing. μBenchmarks can be selectively deployed to cause a configurable and quantifiable pressure on a specific resource, and in this regard, the selection of suitable μBenchmarks can be vital in producing an accurate TCM.

Every task to be analysed by the TCM and contended with another task must be previously instrumented or sampled to extract their shared resource usage pattern or footprint (either coarse or fine). To carry out this work, hardware performance monitoring counters (PMCs) must be read at several points of the task execution in isolation in order to generate an accurate resource footprint. PMCs are hardware counters built into modem processors that count the number of events of a certain type (e.g., number of instruction cycles or number of cache misses) at run-time.

Collecting all the required information can be tedious and usually extremely time consuming, requiring a great expertise on the platform to analyse. In addition, the process is not generic and requires very specific information that is tailored to a given architecture. This means that μBenchmarks, TCMs, and the set of PMCs to gather must be adapted every time anew platform is added. For example, if it is desired that a new COTS MCP is used, then this information must again be determined for that specific architecture, before certification for its use in safety critical uses can be achieved. This process is usually achieved by analytical models, which again are very time consuming, as well as requiring highly skilled operators to gather the required data, for each piece of hardware that is desired to be used.

However, it has been recognised that, to tackle the above outlined complexity of building TCMs by hand (using analytical models), Machine Learning (ML) may be utilised to generate a black-box TCM for a given platform to build an AI model that is able to accurately predict task's WCETs and the timing of each interference channel, given their behaviour in isolation.

From herein, to help with the understanding of how such a black box machine learning algorithm can be trained, and then used for inference, the following terms are defined, and selected:

Simultaneous tasks: given an architecture with c physical cores (either homogeneous or heterogeneous), the maximum number of tasks able to run simultaneously (provided only one task at a time runs on a single core) will be ntasks=c, and therefore 1<ntasks≤c.

PMCs: a set of Performance Monitoring Counters $PMC_i$; i={1, . . . , N} that are chosen from the available PMCs in the architecture. To accurately measure the degree of contention that is experienced by certain tasks, the selection of PMCs that are monitored should strongly correlate to those that are triggered when the interference channels are accessed, either on read or write operations. Whilst monitoring all PMCs might give a more complete and accurate picture of all possible sources of contention, a reduced set of PMCs will help to the ML TCM system to converge faster.

As a default, the instrumentation characterization can gather all PMCs that are available on the platform. From these, if desired, a subset of PMCs may be selected, in order to help the ML TCM system to converge faster. For example, feature selection techniques to select a narrow subsection of the most relevant PMCs may be performed. In this way, the PMCs that are most useful to characterize the application behaviour can be effectively and efficiently selected. Additionally, or alternatively, the software or hardware architecture may be analysed to deduce which PMCs could be potentially useful. Such an analysis may also be optimized using the data that is collected.

μBenchmarks: a set of μBenchmarks $B_j$; j={1, . . . , M}; are defined and selected. As outlined above, these synthetic benchmarks will stress certain interference channels of the architecture in an isolated way (e.g. L1 (caches that are local to a core), LLC (last level cache) and buses). With each μBenchmark, the associated $PMC_n$ to that channel is gathered. The obtained hardware counters (PMCs) are then used to characterize the behaviour of the interference channel under ideal, and then contention conditions as outlined below. Each platform has a selection of μbenchmarks that are be available for said platform. In order to obtain a wide spectrum of datasets that can be used later on to generate the ML-based TCM, all of the benchmarks may be executed and contended with one another. However, it would be appreciated that useful data may still be obtained from a subset of available μbenchmarks.

Pairing Scenarios: a set of Scenarios $$S_k(B^1_{j_1} \| \ldots \| B^{ntasks}_{j_{ntasks}}); k = \{ \ldots , P\}; j_1, \ldots ,$$

$j_{ntasks}$={1, . . . , M} are generated by pairing up to ntasks of μBenchmarks together, and extracting the resulting $PMC_n$. In the above example, where a quad core processor is used, then 4 μBenchmarks must be paired together for each scenario. In this way, a reference to a pairing scenario does not necessarily refer to the pairing of only two tasks, but rather a set of ntasks together, depending on the number of tasks that may be simultaneously executed in the multiprocessor system.

For example, the function $$S_k(B^1_\alpha \| B^2_\beta \| B^3_\gamma \| B^4_\delta)$$

denotes the k pairing scenario in a quad-core architecture (ntasks=c=4), where $B_\alpha$, $B_\beta$, $B_\gamma$ and $B_\delta$ μBenchmarks are executed simultaneously, so as to contend with each other on consecutive cores. In this example, the '‖' operator denotes the contend operation between a set of tasks. The maximum number of pairing scenarios (P) for ntasks and M μBenchmarks are determined by a k-combination with repetition in a homogeneous platform, $$P^{ntasks}_M = C^{ntasks}_{M+ntasks-1} = \binom{M + ntasks - 1}{ntasks} = \frac{(M + ntasks - 1)!}{ntasks!(M - 1)!}$$

If the architecture is heterogeneous or not symmetric (in terms of bus interconnection) and the core placement of the μBenchmarks is relevant, P will be determined by a k-permutation with repetition, $$P^{ntasks}_M = M^{ntasks}$$

As would be understood, in order to produce a ML-based TCM, it is necessary to train a ML model using a known range of inputs and their corresponding outputs, such that it may subsequently infer outputs for a given number of inputs. Therefore, the following steps may be undertaken:

1. Execution of each $B_j$ μBenchmark in isolation to extract ideal characteristic footprints.

2. Execution of the $S_k$ pairing scenarios to obtain contention behavior of the interference channels on the execution time.
3. Training of the Machine Learning Task Contention Model using output data from step 1 ( $$PMC_i^{B_j}$$

measures in isolation) and step 2 ($\Delta T^{B_j}$) as training inputs.

4. Inference of the Machine Learning Task Contention Model to validate the training error with actual execution tasks inputs, as opposed to surrogate μBenchmarks tasks.

As would be appreciated, these four steps can define the lifecycle of the machine learning model. Steps 1 to 3 refer to the training of a model, such that it may then be used to achieve step 4, which is an inference phase, where the model may be validated by comparing the predicted delay from the model to the actual measured delay associated with real task inputs. The trained model may then be put into action with defined inputs to produce an actionable output—e.g. a TCM for a given MCP. The TCM may then subsequently be used for scheduling and mapping, as outlined above. Each step outline above is detailed below, by way of example.

μBenchmark Execution in Isolation

In the first step, all selected μBenchmarks may executed in isolation and in ideal conditions to extract their characteristic footprints. In order to achieve this, the target architecture must be analysed carefully to identify the PMCs associated with interference channels. Such an analysis can identify the interference channels that are present in the MCP in its current hardware configuration. Taking the architecture of FIG. 1 for example, L2 may be enabled/disabled, as may any other optional device that can be disabled.

Figure 4:
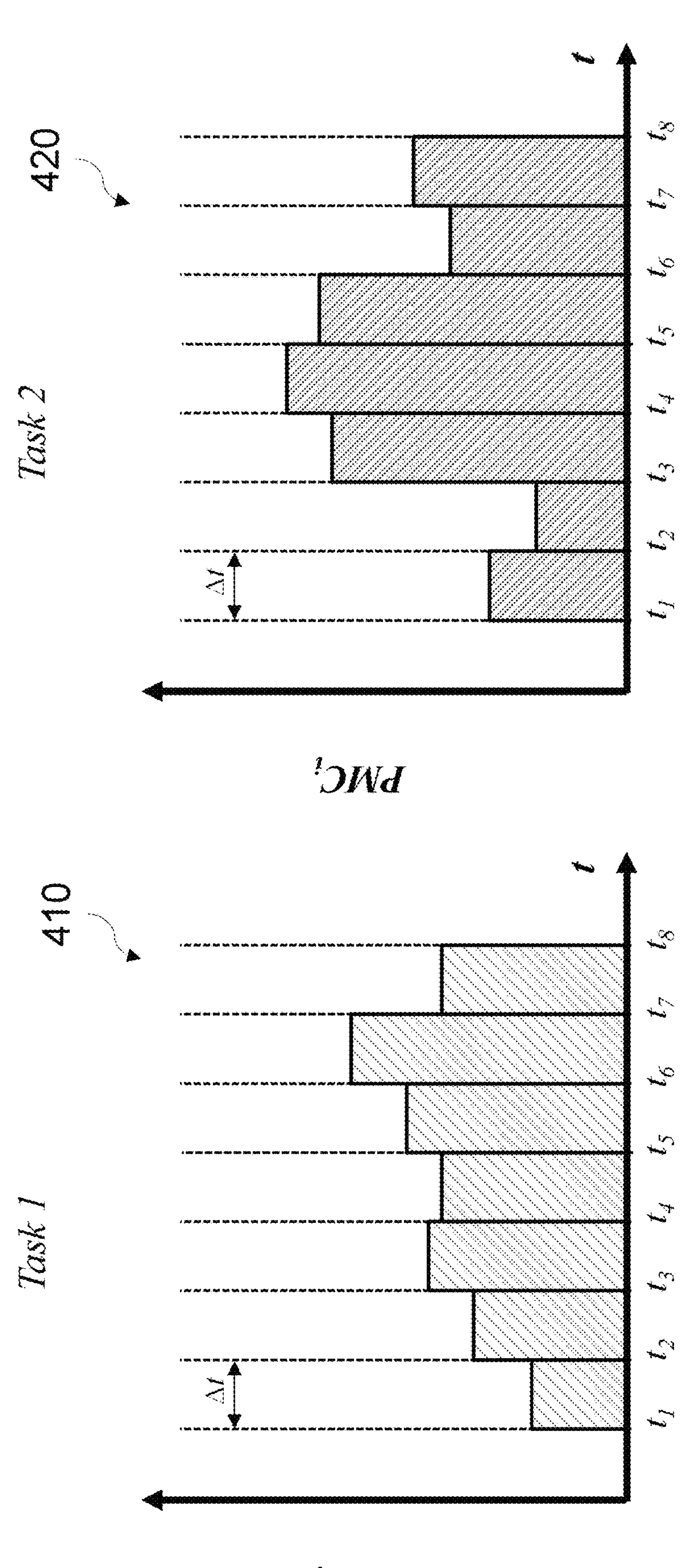
FIG. 4 shows example PMC profiles that are gathered for two different tasks as a function of time.

Only those performance metrics that capture the contention of the interference channels should be considered. These may be chosen by selecting suitable PMCs to measure from an analysis of the target architecture and the identification of a specific interference channel, as above. Additionally or alternatively, it may be desirable to collect all possible PMCs and then perform analysis on the gathered data to identify the most pertinent PMCs, thereby reducing the number of variables. In addition, the metrics gathered should be represented as a function of time, as can be seen in FIG. 4. FIG. 4 shows the PMCs that are gathered at 8 different time points for two different tasks, Task 1 in graph 410, and Task 2 in graph 420. These graphs plot a PMC count per task at various timepoints ($t_1$ to $t_8$) in their execution, from the beginning to the end of the task (when run in isolation).

In order to collect such metrics, the instrumentation of the μBenchmarks with certain granularity (i.e. that complete a certain amount of work) should be used. Traditionally, performance tools only automatically instrument the routine entry and exit points of an application, and therefore only aggregates data when the selected routines starts or stops. On the other hand, manual instrumentation adds callbacks to monitoring functions at particular applications spots (i.e. at certain points during the execution of a task).

Whereas the automatic instrumentation (i.e. the sampling at the start and finish of a task) adds coarse information, the manual instrumentation involves additional effort and can incur on overhead for fine grain measures. In order to solve this issue, a sampling mechanism should be used to collect punctual performance measurements at a variable monitoring frequency (e.g. small ($\Delta t$)) with a low overhead.

The frequency of the PMC measurements may be varied (i.e. sampling with a shorter time period between each of t1 to t8). In theory, the finer the PMC measure the better. A fixed and small $\Delta t$ monitoring frequency (i.e. time between PMC measures) would allow for the capturing of task behaviour with more detailed results. To do so with a low overhead, and as explained before, a smart sampling mechanism for fine-grain instrumentation is required.

Pairing Scenarios Execution

Once all of the selected μBenchmarks have been executed in isolation and their PMCs have been collected, all possible pairing scenarios ($S_k$), as discussed above, may then be executed, to measure the effect of contention that results from the simultaneous execution of the tasks over the interference channels and the variability on their typical execution time ($\Delta T$). This can be seen in FIG. 5, which illustrates the contention effect produced due to the execution in parallel of Task 1 and Task 2, which is in turn visualised in graph 500.

In order to obtain a reliable footprint of a task, it must be obtained in isolation. This discards any potential variation due to the non-deterministic behaviour when more than a single task is executed in parallel. Therefore, tasks profiles (footprints) should be always gathered in isolation to avoid variability in measurements and no collateral effects.

Figure 5:
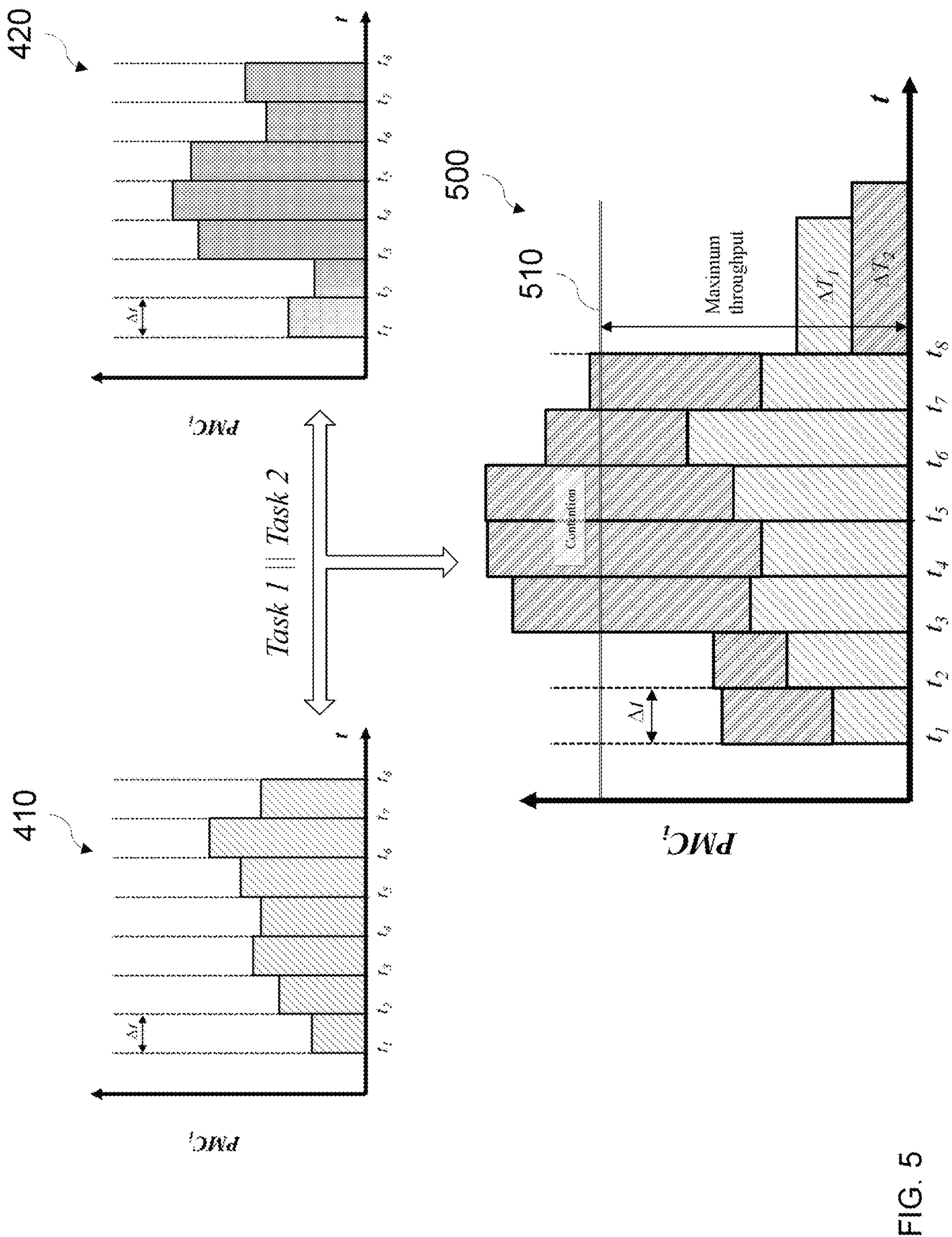
FIG. 5 shows the contention effect produced due to the execution in parallel of two tasks.

FIG. 5, shows the execution in parallel of two different μBenchmarks (task 1 and task 2) within a certain pairing scenario, and how it produces contention. For a given architecture, such as the one illustrated in FIG. 1, a certain PMC will have a maximum throughput 510 without contention on shared resources within the architecture. Whilst the separate execution of the tasks will remain under this maximum throughput, and therefore will allow for a timely completion of each task, when run in parallel, this throughput may be exceeded (i.e. when the sum of the PMCs of each individual task exceeds the maximum throughput). As a result of the exceeding of the maximum throughput, an increase of the average execution time of Task 1 and Task 2 ($\Delta T_1$, $\Delta T_2$) is produced as a consequence of the interference, as illustrated in FIG. 5. As a result, whilst in isolation both tasks finish by t8, when they are run in parallel, Task 1 takes an additional time $\Delta T_1$, and Task 2 takes an additional time $\Delta T_2$.

This information may be given by a TCM and used to a calculate the actual WCET of a given pair of tasks that are concurrently operating. The actual WCET of task 1 and task 2 in this example may be the WCET of task 1 and task 2 when executed in isolation, plus $\Delta T_2$ which is the largest delay resulting from the contention. This actual WCET is the time that needs to be considered in safety/time critical applications, when scheduling/mapping tasks.

Of course, whilst the example of FIG. 5 shows only 2 tasks running in parallel, it would be appreciated that a similar process may occur for ntasks running in parallel on c cores.

The above interference that results from the simultaneous completion of any given pair of tasks can be measured by monitoring the selected PMCs, and collected with monitoring tools. The gathered information may then be used for training the TCM.

Training of the Machine Learning Task Contention Model

Figure 6:
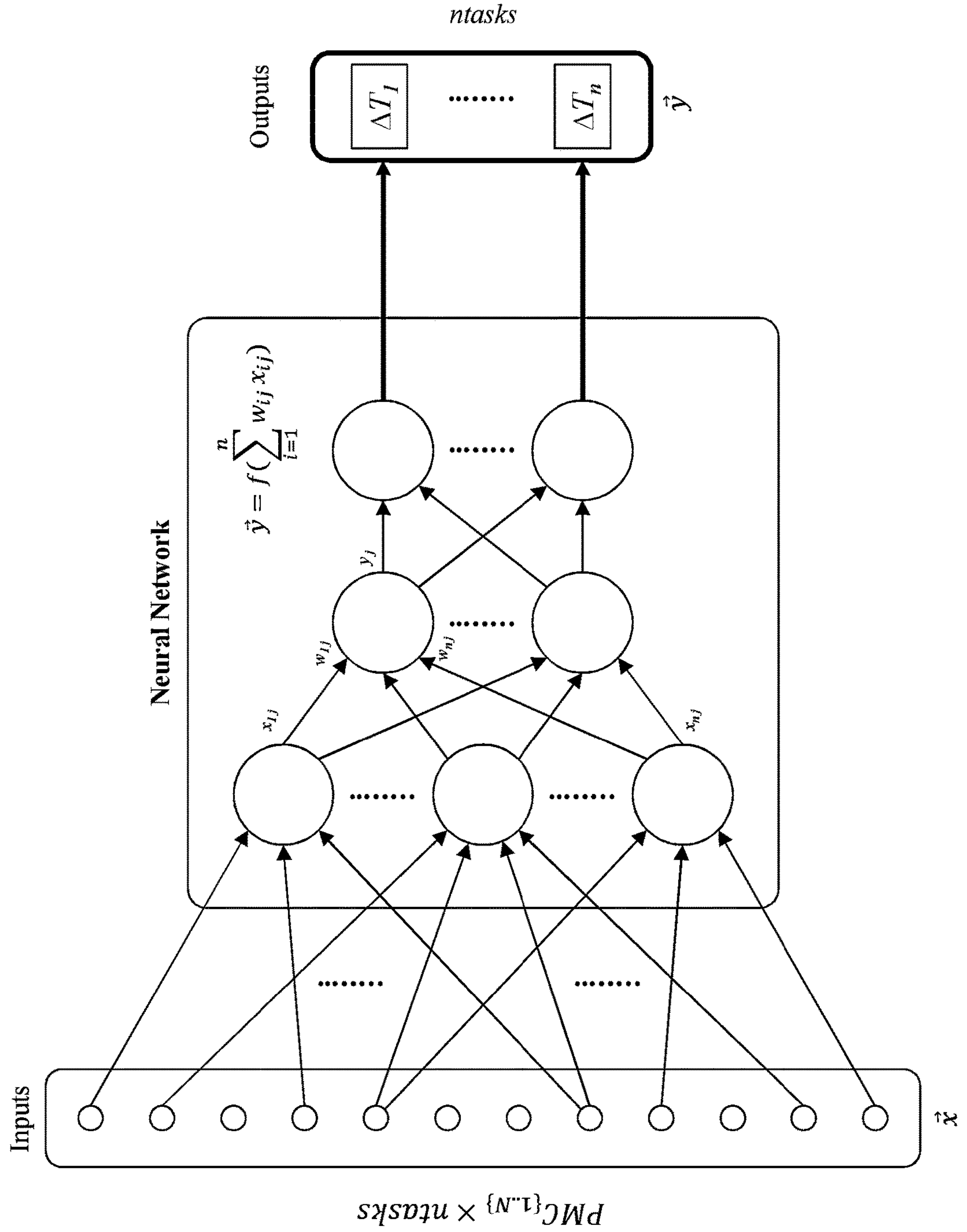
FIG. 6 shows example inputs and outputs for a neural network topology proposed for a ML-based TCM.

With the above information (the ideal execution of μBenchmarks in isolation and the recording of their associated PMCs as a function of time, and the contention behaviour obtained from the concurrent execution of task pairs), a Machine Learning Task Contention Model, such as the example seen in FIG. 6, may then be trained. Specifically, the model may be trained with the following:

As inputs: Performance Monitoring Counters metrics $PMC_i$; i={1, . . . , N} from each μBenchmark used as a contender $$\left(B_{j_1}^{1} \| \ldots \| B_{j_{ntasks}}^{ntasks}\right)$$

on the pairing scenario ($S_k$). The input array ($\vec{x}$) is composed of as many entries as there are PMCs selected to accurately characterize the μBenchmarks and the number of tasks to deploy on the architecture ($PMC_{\{1 \ldots N\}}$×ntasks).

As outputs: Variability of time observed ($\Delta T_1$, . . . , $\Delta T_{ntasks}$) during the parallel execution of the pairing scenario $$S_k\left(B_{j_1}^{1} \| \ldots \| B_{j_{ntasks}}^{ntasks}\right)$$

for each of the contenders. The variability on their typical execution time may be expressed in percentage increase (%), or any other metric, such as a number of processor cycles. For instance, a $\Delta T_{task\ a}$=1.1 will represent an increase of 10% over its typical execution time for task a.

A diagram of said input and outputs for the neural network topology proposed for the ML-based TCM is shown in FIG. 6. As can be seen, the number of PMCs used to characterize the tasks and the number of tasks to deploy (ntasks) will set the topology.

Figure 7:
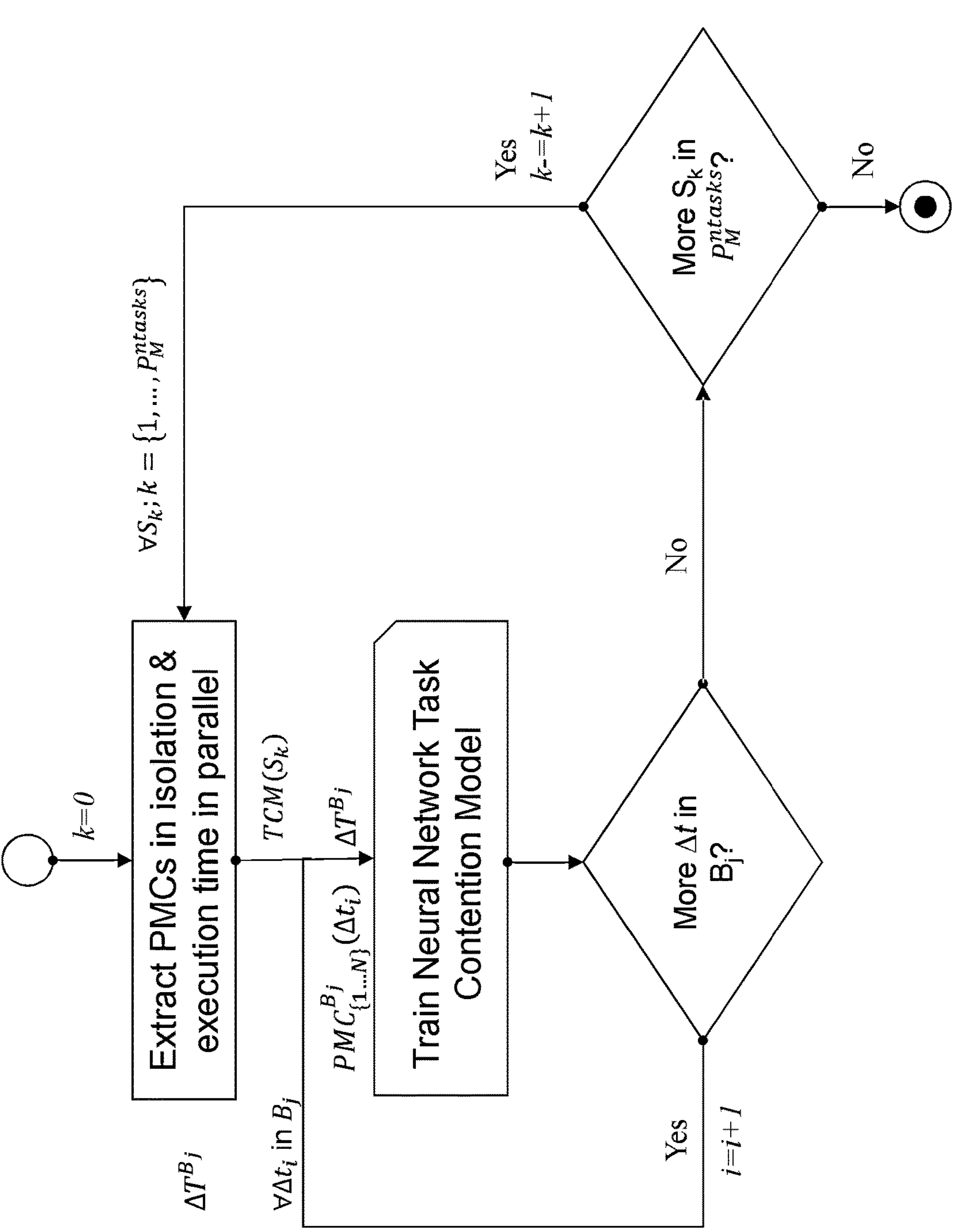
FIG. 7 shows an example training loop for a ML-based TCM.

An example training loop is shown in FIG. 7. As can be seen the training process may be composed of two main loops: a first loop iterating over different k pairing scenarios $$\left(P_M^{ntasks}\right),$$

whereas a second loop iterates over all $\Delta t_i$, i.e. each of the PMC samples that have been gathered for each μBenchmark in isolation, as well as in contentious conditions.

Inference of the Machine Learning Task Contention Model

Once the ML-based TCM has been trained and the error shown is low, the trained model may then be ready to be used to predict WCETs for contending tasks.

Figure 8:
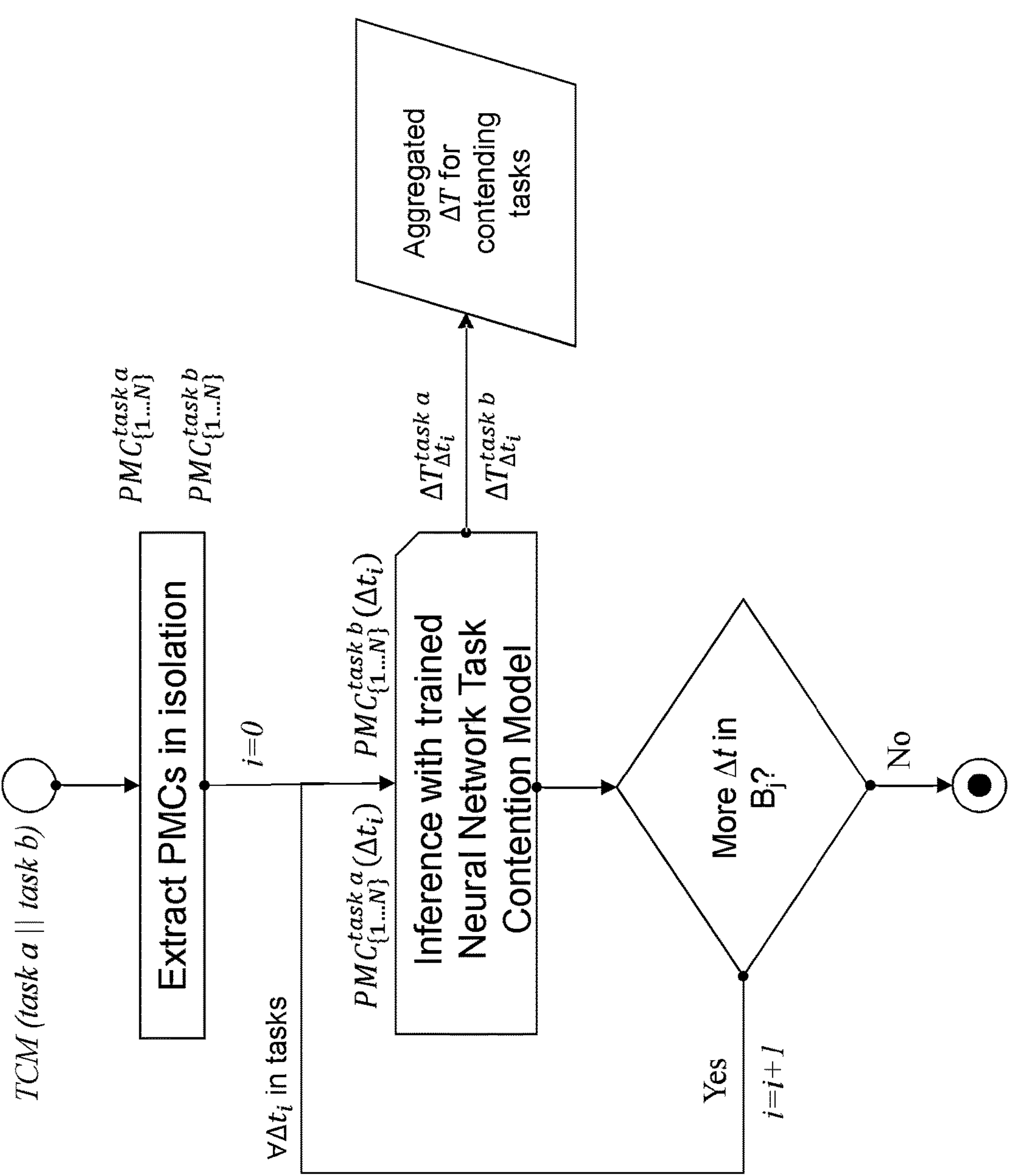
FIG. 8 shows an example inference loop for a ML-based TCM.

In order to proceed with the inference of the model, an example flowchart of the inference process may be utilised, as seen in FIG. 8. This figure shows the execution flow performed to compute the contention of two tasks (TCM (task a||task b)).

First, the interference channel footprints of task a and task b are manually extracted in isolation from the given architecture, in order to obtain all required inputs for the trained ML-based TCM.

Then, the model is iteratively inferred in a loop for each PMC sample of Δt size. Within this loop, the increase of the execution time associated with each Δt due to contention is aggregated in order to generate the final ΔT of each contending task. In this way, for each Δt, a corresponding increase in execution time is inferred and summed so as to give a final delay ΔT that results from the parallel computation of the contending tasks.

By providing a faster way of generating specific TCMs for a given MCP, the time required for certification of such a system may be vastly reduced. A ML-based TCM may allow for a fast characterization of interference channels. The actual WCET may be estimated earlier, thereby improving the TCM's accuracy and reducing its uncertainty. The certification process may be accelerated by proposing solutions closer to the final one and decreasing the number of iterations. Finally, once the ML-based TCM is created for a given architecture, only task behaviour in isolation is required, which greatly reduces the amount of data that needs to be collected so as to produce a TCM.

Further, the reduction in time needed to produce a TCM may accelerate the hardware characterization, and thereby ease porting. As outlined above, the mapping and scheduling of tasks to cores in a MCP can be done automatically for new platforms. Software tools can use the TCM to get insights about how to do it in an efficient way. Therefore, such a TCM allows for the much more rapid and effective configuration of a new platform to comply with software requirements and certification.

Example Implementation

The above outlined method for generating, and validating a TCM to predict contention delays can be performed for any suitable MCP architecture, to predict contention delays that will result from the scheduling of tasks on that processor.

For example, one such architecture (for the purposes of illustration) may be the 28 nm QorIQ® NXP T2080 platform. This is a MCP architecture that has broadly been adopted for embedded systems to implement safety-critical applications, for which a ML-based TCM has been trained, and used according to the methods outlined above.

This specific architecture comprises 4 cores, each owning its private instruction and data L1 cache. An L2 banked cache of 2 MB is shared among cores. However, a specific configuration—also known as Platform Usage Domain (PUD)—is enforced by the type 1 hypervisor to partition L2 cache into 4 regions to reduce contention. The hypervisor configures cache partitioning using the T2080's hardware support for cache partitioning, so each core gets access to one fourth of the 16 cache ways (i.e. 4 ways). The CoreNet Coherence Fabric (CCF) and the memory controller are the main SoC interconnects.

Training Data Generation

As discussed above, the generation of data inputs for the ML-based TCM is fundamental in order to provide a wide spectrum of isolation and pairing data scenarios $$-PMC_i^{B_j}$$

metrics and $\Delta T^{B_j}$ delays. In this way, the chosen dataset must include a realistic and representative set of tasks that will be used for training purposes. A key factor to narrow down the parametric domain is to consider the intrinsic nature of the applications that the TCM is targeting. For example, if the main target of the TCM is safety-critical applications, then it is desirable to bind the inputs accordingly to reflect the typical duration of those kinds of tasks.

Such safety critical applications have hard real-time requirements, and tasks need to be executed periodically in a short and allotted time budget to ensure the responsiveness of the control system. One example is the flight control system (DAL-A) that an aircraft computer might implement to provide certain level of autonomy, e.g. autopilot. In that case, tasks need to be executed at a high frequency, in the region of +100 times per second (100 Hz). To satisfy such a frequency, the complete control logic is allocated a time allowance 10 ms to execute the full operational system, such that it can be completed 100 times a second. The full operations may include: processing inputs from aircraft sensors, data manipulation and augmentation, control law and output conversion functions that are finally provided to the actuators of the aircraft.

Therefore, when producing a TCM for a given MCP that is to schedule tasks for a flight control system that operates at 100 Hz, the tasks chosen to produce PMCs for training the TCM can be filtered and narrowed down, based on the desired application. In this application, then only tasks having profiles with a given maximum duration may be chosen (e.g. up to 10 ms in this case). By narrowing down the tasks of the training set in this manner, it is possible to improve the performance of the ML-based TCM.

As outlined above, the ML-based TCM requires a set of PMC profiles that characterize the tasks under analysis in isolation as an input vector, and a set of expected delays, one per core, that tasks will experience due to contention as an output vector. To generate that data, a representative application (/task) database that will be used as synthetic contenders is required, by choosing and executing μBenchmarks that represent small synthetic code blocks that mimic the behavior of tasks, such as actual safety-critical tasks.

Applications running on von Neumann architectures (CPU-Memory model) can be divided between compute, and memory bound. For a given hardware platform, the performance of the application is limited by the number of arithmetic operations that are performed. On the other hand, on memory bound applications, the performance and throughput of the system will be limited by the number of accesses (either reading or writing) that the application performs. This memory ratio classification is expressed as Arithmetic Intensity (AI) for a code block.

It has been found that this intensity metric can be used to smartly generate and tweak μBenchmarks that are used to obtain tunable tasks' characterization footprints in isolation $$(PMC_i^{B_j}$$

metrics) and the contention delays for pairing scenarios ($\Delta T^{B_j}$ delays). These parameterizable μBenchmarks may then be used in a code block repository, which can then be used to generate the desired interference and contention scenarios for training data that may be used in training an accurate ML-based TCM.

Essentially, it is desirable to select μBenchmarks that represent the whole spectrum tasks, those being tasks from AI roughly equalling 0 (i.e. those with an AI metric close to 0, that have many memory transactions and a few floating point operations) to tasks with a high AI metric (i.e those with many flops and only a few reads/writes). Such μBenchmarks therefore give a wide representation of actual tasks that are to be completed on an MCP architecture, and will therefore be able to train a more accurate TCM.

Feature Selection

It has been found that conventional methods used for dimensionality reduction, such as principal component analysis (PCA), Autoencoders and wrapper methods, do not effectively compress the information to improve the quality of the contention delay prediction of a trained ML-based TCM.

However, it has been found that by limiting the number of inputs in the feature array does have a positive impact on the quality of the predictions. For example, the performance of the features may be evaluated empirically through metrics such as a Cumulative Gini Index (CGI).

Figure 9A:
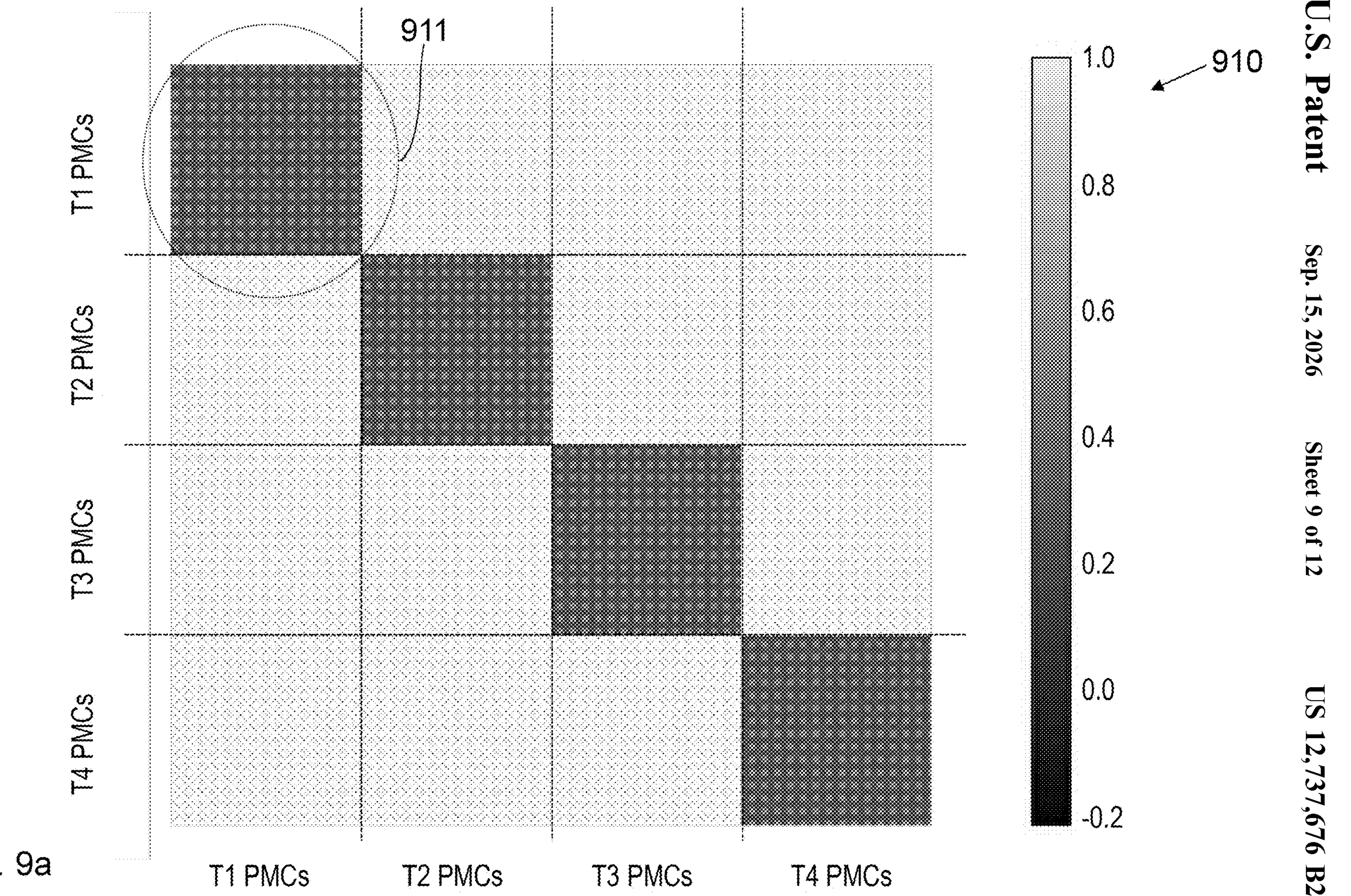
FIG. 9*a* shows a feature correlation analysis of PMCs resulting from four completed tasks.

In order to do so, a feature correlation analysis may be performed, as seen in FIG. 9*a*. As would be appreciated, the concept of correlation describes the degree to which two variables vary in coordination with one another, whereas cohesion considers the degree to which the elements inside a group may be regarded as a unique feature.

Figure 9B:
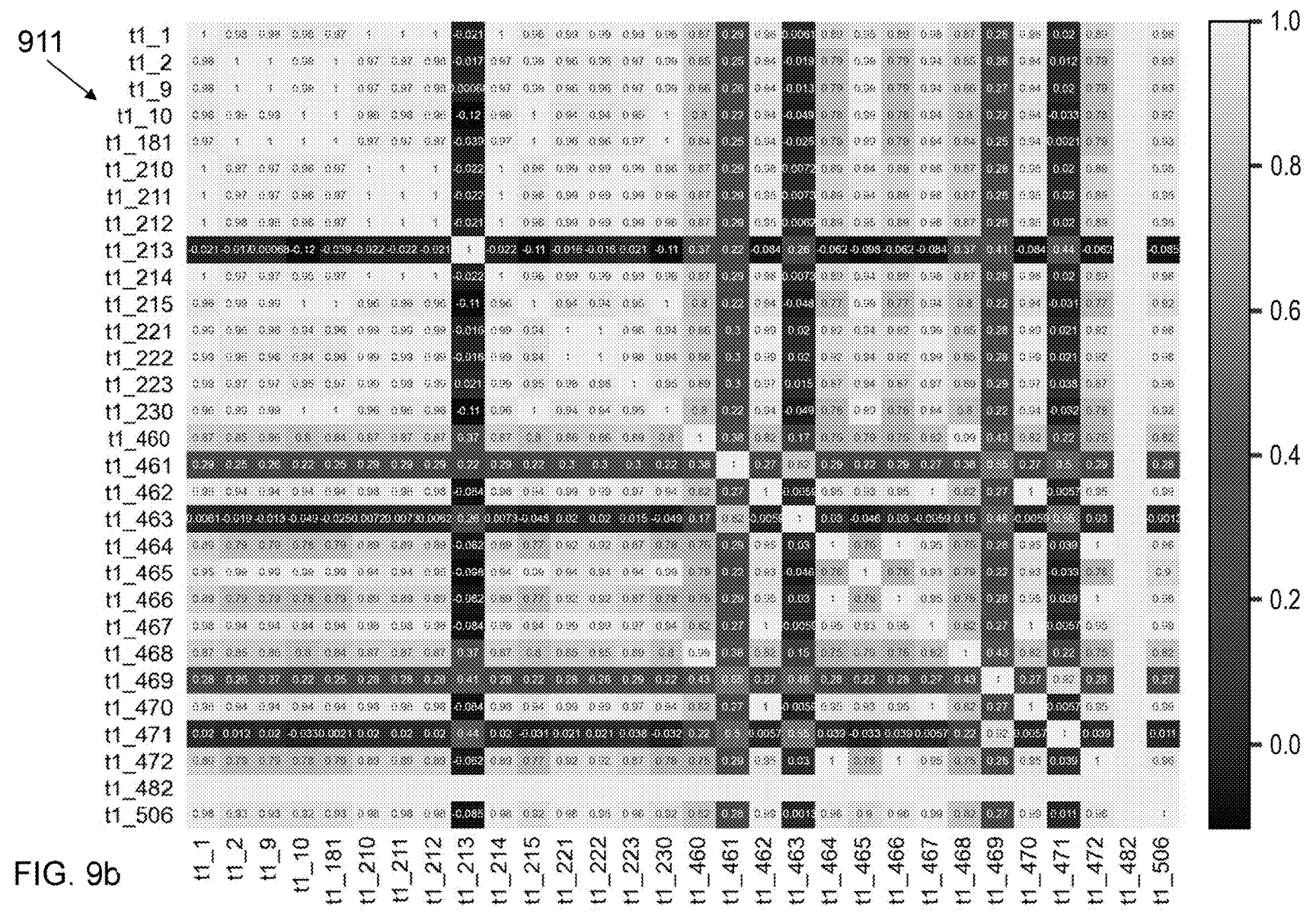

Graph 910 shows the cohesion between the measured PMCs of four example tasks (T1 to T4) performed in isolation. A zoomed in subsection 911 of the cohesion between the PMCs of task 1 on both axes may be seen in FIG. 9*b*. As can be seen in graphs 910 and subsection 911, the feature correlation analysis shows that PMCs belonging to the same task are highly cohesive in the context of information entropy ($H=-\Sigma_i p_i \log_2(p_i)$, where $p_i$ is the measured occurrence of each PMC). Whereas FIG. 9*b* shows a selection of PMCs associated with task 1 (t1_1 relating to PMC_1 from task 1, t1_2 relating to PMC_2 from task 1 and so on), it would be appreciated that these PMCs are available for each task, and are compared to measure their cohesion.

In a data-driven solution, it may be desirable that informational cohesion is avoided. If two features (e.g. two PMCs) contribute towards a prediction with the same or similar information, then one of the PMCs may be discarded, or both PMCs merged into one, without losing additional information.

Therefore, given that PMCs belonging to the same task are (in general) highly cohesive, it may be deduced that that it is not useful to utilise PMCs selected only from the same task in training, but rather it may be beneficial to compare and take PMCs from the measured PMCs across different tasks. The information provided by PMCs of different tasks may be less cohesive and therefore more unique. In comparison, selecting PMCs from only the same task results in combined information that is prone to repetition and redundancy. As such, it has been found that it is possible to infer more information in a ML-based TCM from combining PMCs from different tasks rather than from the same one.

For example, the above analysis was performed when selecting suitable PMCs for use in training a TCM for the example NXP T2080 architecture discussed above. Each PMC available for the architecture was characterised by their degree of correlation between tasks. Using this information, the PMC array for training may be reduced, whilst still retaining a wide range of relevant training information.

Using information obtained regarding the correlation of PMCs as illustrated in FIGS. 9*a* and 9*b*, an index may be used, such as a CGI, so as to measure and rank the "feature importance" that the features (the PMCs) have for predicting contention delays. Table 1 below shows the 8 PMCs with the highest information density for the example architecture for each independent task. As would be appreciated, the Gini Index is cumulative as it accumulates across each different task, thereby pulling the values across different tasks together to compute a metric by which each PMC can be ranked based on their degree of correlation (or lack of correlation with other PMCs), and therefore their usefulness.

TABLE 1

Top 8 PMCs with the highest information density for experiments with 4 cores

| PMC | Description | CGI |
|---|---|---|
| 1 | Processor cycles | 0.7913 |
| 9 | Load micro-ops completed | 0.0684 |
| 213 | Cycles LSU idle | 0.0636 |

TABLE 1-continued

| Top 8 PMCs with the highest information density for experiments with 4 cores | | |
|---|---|---|
| PMC | Description | CGI |
| 10 | Store micro-ops completed | 0.0212 |
| 457 | L2 misses | 0.0201 |
| 221 | Data L1 cache misses | 0.0064 |
| 222 | Data L1 cache load misses | 0.0062 |
| 465 | L2 hits per thread | 0.0045 |

Each of these PMCs are then measured for each task for which the contention delay needs to be estimated. Therefore, in this example where 4 cores are running in parallel, the PMCs used for forecasting the contention delay will be:

PMC_1 from task 1
PMC_1 from task 2
PMC_1 from task 3
PMC_1 from task 4
PMC_9 from task 1
PMC_9 from task 2
PMC_9 from task 3
PMC_9 from task 4
PMC_213 from task 1
PMC_213 from task 2
PMC_213 from task 3
PMC_213 from task 4, and so on.

By using only these 8 features for the PMC array, the root mean squared error (RMSE) of the regression task (averaged between all cores) was reduced by about 4%. In this way, by pruning the PMC array using correlation (and cohesion) to produce a ranking of feature importance to select the most valuable PMCs for input into training the ML-based TCM, the error of the predicted time delays of the trained ML algorithm was actually reduced, compared to a similar ML algorithm that was trained using all PMC data. This is in contrast to the other above listed conventional methods such as PCA, Autoencoders and wrapper methods, which only added to the RMSE.

As would be appreciated, the individual PMC numbers and their description may be obtained from the manufacturer of a given architecture.

Without being bound by any theory, it seems that this may be explained by the fact that only a small selection of the PMCs actually contribute towards the prediction. Due to the nature of PMCs, it is otherwise difficult to determine theoretically whether any of the counters are indicative of the delay that will be produced between contending tasks. Therefore, in practice, this means that many of these PMCs may only add noise to the prediction.

Therefore, by filtering the PMCs by their degree of correlation, further information is added that allows for selection the most relevant PMCs, of and filtering out of the least valuable PMCs that are likely to only add noise to the prediction. Then, for inference of a delay, only the corresponding PMCs of the contending tasks need to be input into the ML-based TCM.

Machine Learning Modelling

As outlined above, the modelling task (i.e. the task of predicting a delay resulting from contention of concurrently running tasks) may be boiled down to a multiple regression problem solved with machine learning predictors. The input data for training and evaluating these predictors, as above, may be an array of the PMCs selected for the task (whether that be a selection of a subset of PMCs, or a reduced PMC array). The output will be the different contention delays across the multiple cores, and it will depend on how many concurrent tasks are being executed.

Figure 10:
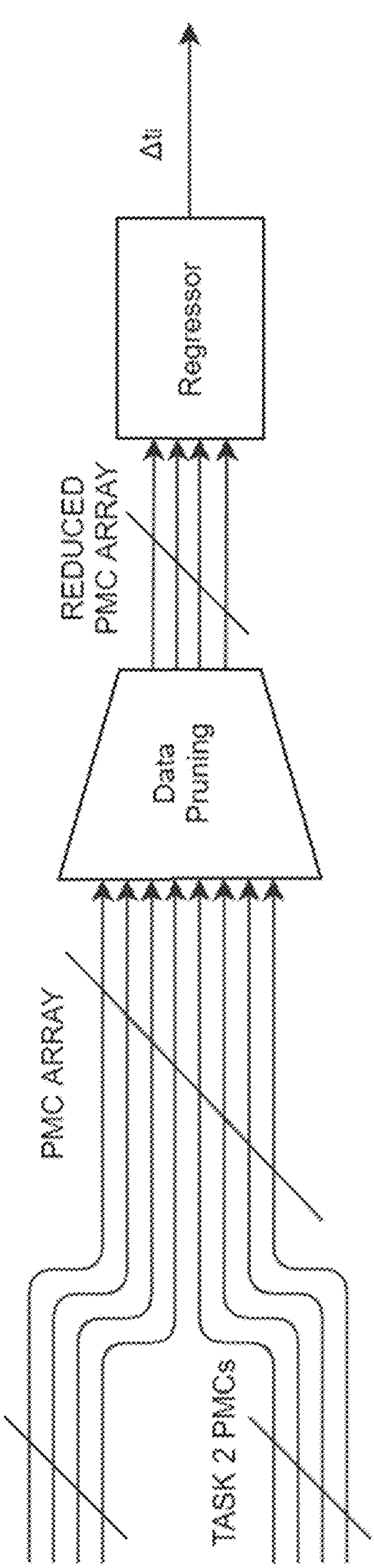
FIG. 10 shows an overview of how a regressor may be used to generate a predicted time delay from an input PMC array.

The ground truth for his delay ($\Delta t_i$) is inferred by substracting the duration of the task in isolation (PMC_1, measured in clock cycles) to the actual duration of the task when being executed in contention with others. This general process is seen in FIG. 10, wherein PMCs for each of two (or more) tasks are combined into a PMC array, then optionally may be pruned (for example, as discussed above) to provide a reduced PMC array to output a corresponding $\Delta t_i$. Of course, this process may be expanded such that the PMC array is an array of PMCs relating to ntasks concurrently being performed on c cores to be entered into the regressor.

However, there may still be a question as to what kind of ML modelling (or regressor, as shown in FIG. 10) will most accurately characterize the performance of a given MCP architecture. In order to do so, various models may be tested, and their resulting error (and other metrics) may be measured, and compared.

For example, when building a TCM for the above NXP T2080 architecture, 4 contending tasks with a series of 7 different predictors (ML models/regressors) were tested, each of which are commonly used in other similar regression tasks. The performance of the regressors using mainly the root mean squared error (RMSE) was then measured, alongside other metrics for a more complete understanding of the capability of the predictors.

In order to assess fairly the accuracy of the tested ML-based regressors, an exhaustive Grid Search that optimized the hyperparameters of the algorithms within a reasonable range was also performed. With this, it is possible to ensure that the models are being tested to the best of the models' abilities. The results of such testing may be seen below in Table 2.

TABLE 2

| Prediction results from the tested ML-based regressors | | | | |
|---|---|---|---|---|
| | RMSE | MAE | R2 | MAPE |
| LINEAR REGRESSION | 2,289,134.4983 | 1,402,207.5752 | 0.4201 | 9,430,922.8773 |
| K NEAREST NEIGHBOURS | 672,222.0076 | 106,303.8754 | 0.9489 | 45,113.0324 |
| DECISION TREES | 590,176.2905 | 104,296.3735 | 0.9428 | 41,373.7006 |
| RANDOM FOREST | 555,253.4783 | 97,892.9885 | 0.9650 | 11,228.2394 |
| NEURAL NETWORK | 608,412.2817 | 246,560.3090 | 0.9586 | 1,634,021.3278 |
| GASS PROCESS | 3,147,522.4965 | 924,631.6476 | −0.0947 | 100 |
| XGBOOST | 500,664.2545 | 125,526.5823 | 0.9717 | 166,976.7837 |

As can be seen above, the show that decision tree-based predictors, such as random forest and especially XGBoost, (extreme gradient boosted trees) achieve the best performance out of every other predictor. Further, it has been found that decision tree-based algorithms also have improved performance when it comes to managing outliers.

Further, XGBoost supports built in Lasso Regression and Ridge Regression (also known as L1 and L2 regularization, not to be confused with L1 and L2 caches), which add a controlled penalty to the learning model to prevent overfitting. Further, this solution supports parallel processing, making the inference of these results remarkably fast (around 0.013 seconds) on multicore systems, thereby reducing lead times when adopting and scheduling tasks for new MCP architectures. Therefore, it may be beneficial to utilize decision tree-based predictors, and in particular XGBoost as a ML-based regressor for training of a ML-based TCM, and subsequent inference of predicted delays of concurrently running tasks.

Comparison Against Analytical Methods

As previously outlined, TCMs have historically been built analytically, which is a very time-consuming and highly skilled process. This means that every task to be analysed by the TCM and contended with another task must be previously instrumented or sampled to extract their shared resource usage pattern or footprint (either coarse or fine). In addition, collecting all the required information can be tedious and usually extremely time consuming, requiring a great expertise on the platform to analyse. In addition, the process is not generic and requires very specific information that is tailored to a given architecture.

Not only is a ML-based TCM much quicker, and simpler to build than an analytical TCM, but can be much more accurate way of retrieving predicted delay for contending tasks.

Figure 11:
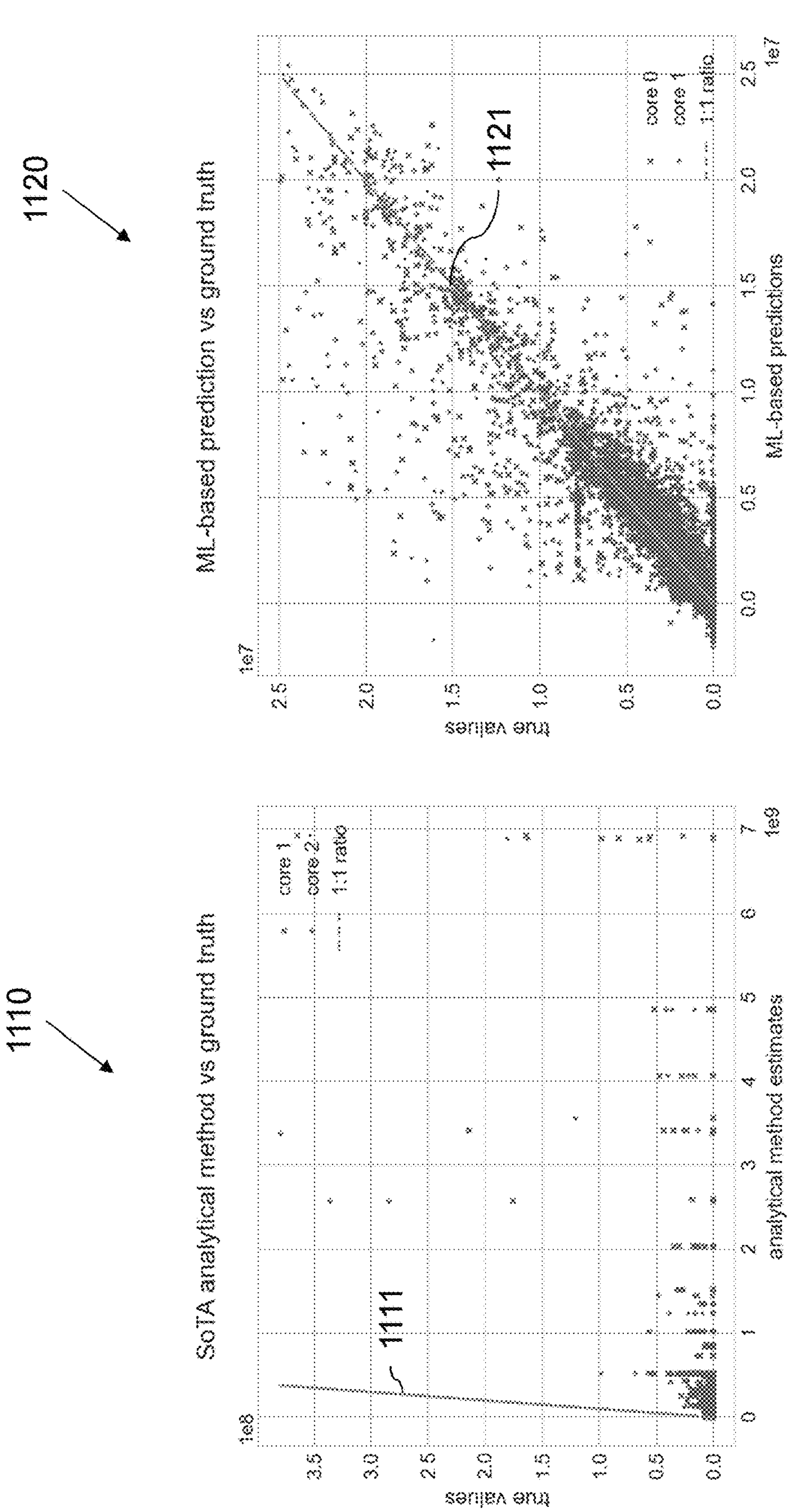
FIG. 11 shows the results of a proposed ML-based TCM compared to an analytical TCM

FIG. 11 shows a comparison between the predicted time of completion, and predicted time of completion of contending tasks using a traditional analytical TCM, and a ML-based TCM.

In general, an analytical TCM models both task overlapping and access pairing, as an Integer Linear Programming (ILP) problem, which allows the model to compute a tight Worst-case Contention Delay (WCD) by implicitly accounting for all possible feasible task overlapping and access pairing.

The computed tight WCD calculation for a given task depends on three main factors:

1. the set of overlapping tasks—interfered task under analysis versus interfering contender(s),
2. the number and types of conflicting accesses to a shared resource that are paired; and
3. The arbitration policy of the shared resource (e.g. FIFO or Round-Robin).

Graph 1110 shows the result of such predictions using a state of the art (SoTA) analytical TCM model for two cores of the NXP T2080 architecture discussed above. The x-axis shows the predicted completion time for a given task under contention, and the y-axis shows the actual completion time of that same task under those conditions. Both axes are logarithmic scales. The predicted completion times using an analytical TCM are then plotted on this graph, as can be seen. Ideal predictions would lie on the line 1110 (where x=y, i.e. the predicted time matches the actual time). As can be seen in graph 1110, is shown to be overly conservative in the pursue of safety by overestimating the delays produced by contending tasks. Whilst it is preferable to overestimate the time taken rather than underestimate the time taken, particularly in safety critical applications, being too conservative enforces the allocation of a substantial budget of time for the scheduled tasks to avoid non-deterministic behaviour of the system. As a result, this leads to the generation of scheduling that is not optimized at all, very slow resulting in poor performance of the system, and is not suitable for deploying a multitasking system where tens of applications would be running.

Graph 1120 shows the result of predictions using a ML-based TCM for two cores of the NXP T2080 architecture described above. A XGBoost prediction model was trained using a pruned set of PMCs by utilizing their correlation, as outlined above. As can be seen in graph 1120, where the x-axis again shows the predicted completion time for a given task under contention, this time using the ML-based TCM, and the y-axis (which is again a logarithmic scale) shows the actual completion time of that same task under those conditions. Both axes are logarithmic scales. The predictions obtained by the ML-based TCM match much more closely to the ideal prediction line 1121, y=x.

Both tests were based on the same dedicated training set (independent from the dataset used for training the ML-based predictor).

As can be seen in FIG. 11, the ML-based approach is far superior when compared to the performance of traditional analytical models used as predictors for task contention. The ML-based approach not only improves the model in accuracy (R2 score is 0.96 vs −308.96) but also in execution time. It is three orders of magnitude faster in terms of inference time when compared against a typical analytical model -~7.5 seconds compared to 0.013 s for inference when executed on a domestic laptop.

Once again, a ML-based TCM may vastly reduce the effort required, in terms of both expert's resources and experimentation time, to generate a reliable Task Contention Model that can predict tasks' delays under contention scenarios. Therefore, a ML-based TCM (and particularly a TCM trained using data selected above) provides for easier certification of COTS-based multi-processing SoCs, by proposing accurate WCETs and decreasing the number of iterations needed. Further, the adoption of multi-core processors for avionics systems may be accelerated. Faster and more efficient development of contention models may be provided. In addition, once the TCM is generated, only task behaviour in isolation is required to provide an accurate prediction, and additionally there may be faster inference compared to complex analytical models that require whole model execution each time.

In addition, it may accelerate hardware characterization to ease porting. Specifically, mapping and scheduling may be done automatically for new platforms, and software tools can use the TCM to get insights about how to do it in an efficient way. The ML-based TCM helps configuring the new platform to comply with software requirements and certification.

It will be appreciated by those skilled in the art that the disclosure has been illustrated by describing one or more specific examples, but is not limited to these examples; many variations and modifications are possible within the scope of the accompanying claims.

The invention claimed is:

1. A method of generating training data for training a Machine Learning based Task Contention Model (ML based TCM), to predict time delays resulting from contention between tasks running in parallel on a multi-processor system, the method comprising:

executing a plurality of microbenchmarks, microbenchmarks $B_j$, on the multi-processor system in isolation and measuring a number of resultant Performance Monitoring Counters, PMCs, over time to extract ideal characteristic footprints of each microbenchmark when operating in isolation;

performing a feature correlation analysis on the PMC metrics resulting from the plurality of microbenchmarks to determine the degree of correlation between each resultant PMCs and the executed plurality of microbenchmarks; and selecting a subset of PMCs based upon their degree of correlation between the plurality of microbenchmarks to form a reduced PMC array, wherein the multi-processor system is a multi-core processor of an avionics system, and wherein the multi-processor system is a homogeneous platform, a heterogeneous platform or asymmetric.

2. The method of claim 1, wherein the plurality of microbenchmarks are selected based on the Arithmetic Intensity, AI, of each microbenchmark to stress certain interference channels of the multi-processor system in an isolated way.

3. The method of claim 1, wherein the plurality of microbenchmarks are selected from a pre-populated code block repository, and are selected so as to generate the desired interference and contention scenarios for training data that may be used in training an accurate ML-based TCM.

4. The method of claim 1, wherein the plurality of microbenchmarks are selected such that they each individually have a shorter execution time individually than a maximum makespan for a given task to be scheduled on the multi-processor system.

5. A computer system for producing training data for training a Machine Learning based Task Contention Model (ML based TCM) to predict time delays resulting from contention between tasks running in parallel on a multi-processor system, wherein the computer system is configured to perform the method claim 1.

6. A non-transitory computer-readable medium storing instructions which, when executed on a computer system, cause the computer system to produce training data for training a Machine Learning based Task Contention Model, ML based TCM, to predict time delays resulting from contention between tasks running in parallel on a multi-processor system, by performing the method of claim 1.

7. A computer-implemented method of producing a trained Machine Learning based Task Contention Model (ML based TCM), to predict time delays resulting from contention between tasks running in parallel on a multi-processor system using training data generated by the method of any preceding claim, the method comprising:

executing a predetermined set of possible pairing scenarios of the plurality of microbenchmarks in parallel on the multi-processor system and measuring the effect on the execution time of each microbenchmark, $\Delta T^{B_j}$, resulting from contention over interference channels within the multi-processor system; and training a machine learning model using, as an input, a reduced PMC array for each microbenchmark in isolation and, at the output, the corresponding $\Delta T^{B_j}$ during the parallel execution of each pairing scenario as training inputs, wherein the multi-processor system is a multi-core processor of an avionics system, and wherein the multi-processor system is a homogeneous platform, a heterogeneous platform or asymmetric.

8. The computer-implemented method of claim 7, wherein the machine learning model is a decision tree-based predictor, and wherein the machine learning model is an XGBoost model.

9. The computer-implemented method of claim 7, comprising validating the training error of the ML based TCM by:

executing a plurality of actual execution tasks on the multi-processor system in isolation and measuring the resultant PMCs corresponding to the reduced PMC array over time for each actual execution task;

inferring, by the ML based TCM, the predicted effect on the execution time of each actual execution task at least the resultant PMCs of each task as input;

executing the actual execution tasks in parallel and measuring the actual execution time; and comparing the predicted effect on the execution time with the actual execution time, thereby calculating an error between the predicted and actual execution time.

10. The computer-implemented method of claim 9, wherein the training of the machine learning model comprises:

a first iterative loop over all different pairing scenarios; and a second iterative loop over each of the selected PMC measures of each microbenchmark in isolation, as well as the corresponding $\Delta T^{B_j}$ during the parallel execution of each pairing scenario.

11. The computer implemented method of claim 7, wherein the measuring the selected PMCs comprises measuring the selected PMCs at a variable monitoring frequency.

12. A computer system comprising:

at least one processor; and a memory storing a Machine Learning based Task Contention Model configured to predict time delays resulting from contention between tasks running in parallel on a multi-processor system, wherein the Machine Learning based Task Contention Model is produced by the method of claim 7.

13. A computer system for producing a trained Machine Learning based Task Contention Model (ML based TCM), to predict time delays resulting from contention between tasks running in parallel on a multi-processor system, wherein the computer system is configured to perform the method of claim 7.

14. A non-transitory computer-readable medium storing instructions which, when executed on a computer system, cause the computer system to produce a trained Machine Learning based Task Contention Model (ML based TCM) to predict time delays resulting from contention between tasks running in parallel on a multi-processor system, by performing the method of claim 7.

* * * * *